(12) United States Patent
Magi

(10) Patent No.: US 9,412,002 B2
(45) Date of Patent: Aug. 9, 2016

(54) WEARABLE ELECTRONIC DEVICE HAVING A FINGERPRINT IDENTIFICATION DISPLAY

(71) Applicant: Intel Corporation, Santa Clara, CA (US)

(72) Inventor: Aleksander Magi, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 14/140,991

(22) Filed: Dec. 26, 2013

(65) Prior Publication Data

US 2015/0186705 A1    Jul. 2, 2015

(51) Int. Cl.
*G06K 9/00* (2006.01)
*G06F 3/01* (2006.01)
*G06F 1/16* (2006.01)

(52) U.S. Cl.
CPC .............. *G06K 9/0002* (2013.01); *G06F 1/163* (2013.01); *G06F 3/016* (2013.01)

(58) Field of Classification Search
None
See application file for complete search history.

(56) References Cited

U.S. PATENT DOCUMENTS

| | | | |
|---|---|---|---|
| D255,022 S | 5/1980 | Hofman | |
| D616,790 S | 6/2010 | Mear | |
| D625,928 S | 10/2010 | Lee et al. | |
| D644,201 S | 8/2011 | Park et al. | |
| D704,938 S | 5/2014 | Mischel, Jr. et al. | |
| D705,777 S | 5/2014 | Groene et al. | |
| D715,290 S | 10/2014 | Bryan et al. | |
| D719,158 S | 12/2014 | Akana et al. | |
| D726,139 S | 4/2015 | Park et al. | |
| D728,561 S | 5/2015 | Park et al. | |
| D729,233 S | 5/2015 | Lee et al. | |
| D729,235 S | 5/2015 | Nagao et al. | |
| 2010/0225607 A1* | 9/2010 | Kim ............................ 345/173 |
| 2012/0318019 A1 | 12/2012 | Cho | |
| 2013/0055761 A1 | 3/2013 | Alford et al. | |
| 2014/0086028 A1 | 3/2014 | Carrion | |

OTHER PUBLICATIONS

Profis, A Dead-simple workout armband, CNET, Mar. 2012.*
Funtronic FS28 FIPS201/PIV BlueTooth Fingerprint Scanner, www.fulcumbiometrics.com, Sep 2012 from Web Archive.*
Single Sign on, Imprivata, retrieved from web archive of Sep. 2011.*

(Continued)

Primary Examiner — Mark Roz
(74) Attorney, Agent, or Firm — Patent Capital Group

(57) ABSTRACT

Particular embodiments described herein provide for a wearable electronic device, such as a bracelet, watch, wristband or armband that includes a circuit board coupled to a plurality of electronic components (which may include any type of components, elements, circuitry, etc.). One particular example implementation of a wearable electronic device may include a strap portion and a first display portion included in the strap portion. The first display portion can include a main display and a first fingerprint sensor configured to capture one or more fingerprints placed on the main display at one or more capture locations. The captured fingerprints can be used to identify a user and log-in the user to the device if the user is authorized to log-in to the device. A fingerprint can also be captured for a finger placed on a secondary display that may be contained in a latch portion of the device.

16 Claims, 14 Drawing Sheets

(56) References Cited

OTHER PUBLICATIONS

"Adidas jumps into wearable computing, announces new $399 smartwatch at Mobilize," http://gigaom.com/2013/10/16/adidas-shows-off-new-smartwatch-that-provides-personal-coaching, printed Jan. 16, 2014, 5 pages.

"High tech meets high fashion," Los Angeles Times, http://articles.latimes.com/2013/may/26/image/la-ig-tech-fashion-20130526, printed Jan. 16, 2014, 3 pages.

Home Decorators. Milton Full Length Mirror on Stand, Aug. 24, 2011 [online] [site visited Jun. 5, 2015]. Available from internet. http://www.homedecorators.com/p/milton-full-length-mirror-on-stand.

USPTO Non-Final Action in U.S. Appl. No. 29/477,893 mailed on dated Jun. 30, 2015.

Wikipedia, "Automated fingerprint identification", https://en.wikipedia.org/wiki/Automated_fingerprint_identification[Jul. 28, 2015]; printed Jul. 28, 2015.

Bluetooth, "Master Table Contents & Compliance Requirements", vol. 1, Part A and vol. 2, Parts A and B, Dec. 3, 2013.

Wikipedia, "Fingerprint recognition", https://en.wikipedia.org/wiki/Fingerprint_recognition[Jul. 28, 2015]; printed Jul. 28, 2015.

Wikipedia, "Flexible organic light-emitting diode", https://en.wikipedia.org/wiki/Flexible_organic_light-emitting_diode[Jul. 28, 2015]; printed Jul. 28, 2015.

Harris, "How Fingerprint Scanners Work", http://computer.howstuffworks.com/fingerprint-scanner2.htm/printable[Jul. 28, 2015]; printed Jul. 28, 2015.

Wikipedia, "Piconet", https://en.wikipedia.org/wiki/Piconet[Jul. 28, 2015]; printed Jul. 28, 2015.

Wikipedia, "Scatternet", https://en.wikipedia.org/wiki/Scatternet[Jul. 28, 2015]; printed Jul. 28, 2015.

Mahmoud, "Wireless Application Programming with J2ME and Bluetooth", Oracle Technology Network—System Admins and Developers; http://www.oracle.com/technetwork/systems/index-156651.html (printed Jul. 28, 2015); Feb. 2003.

USPTO Final Action in U.S. Appl. No. 29/477,893 mailed on dated Oct. 15, 2015.

* cited by examiner

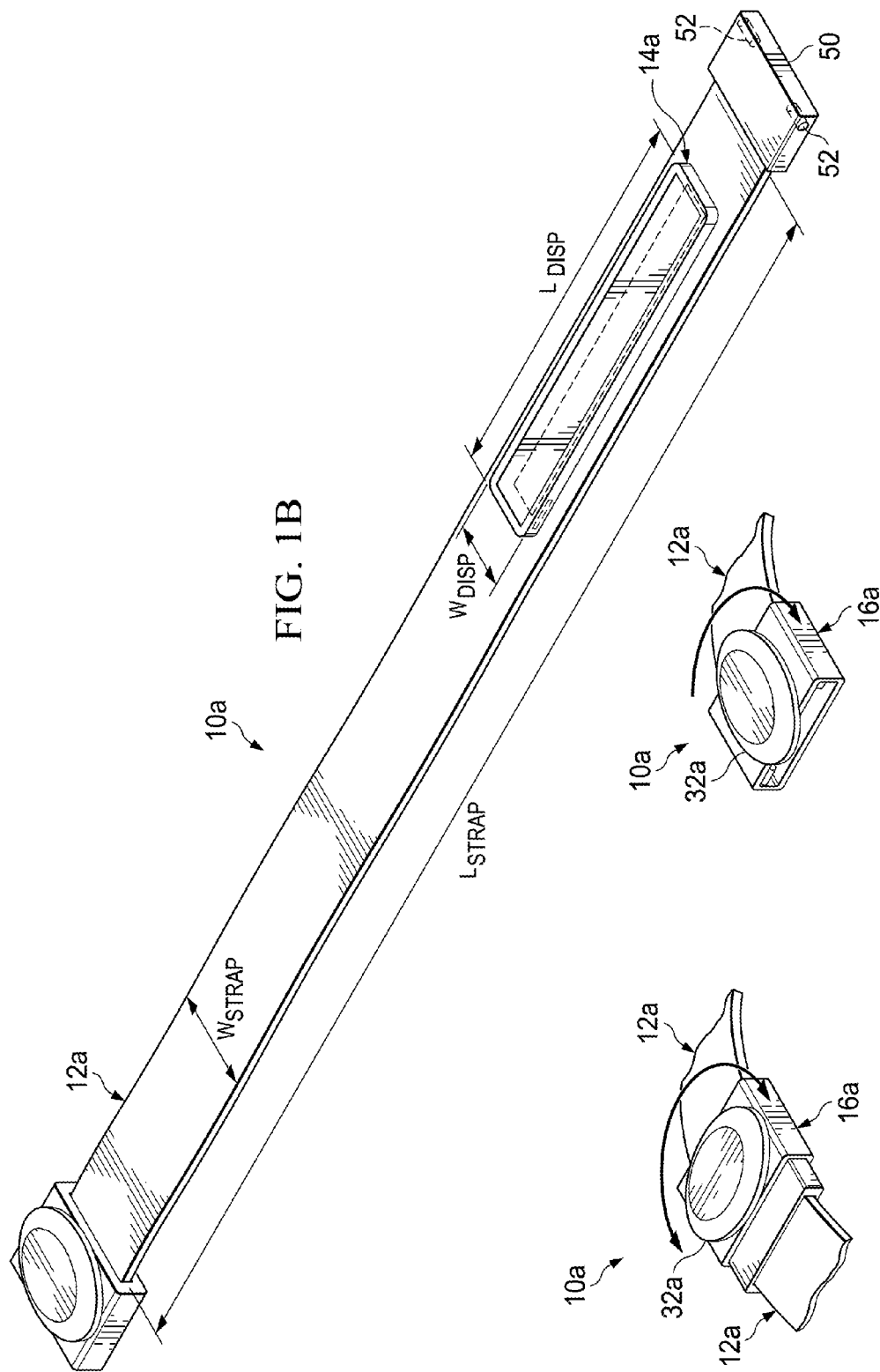

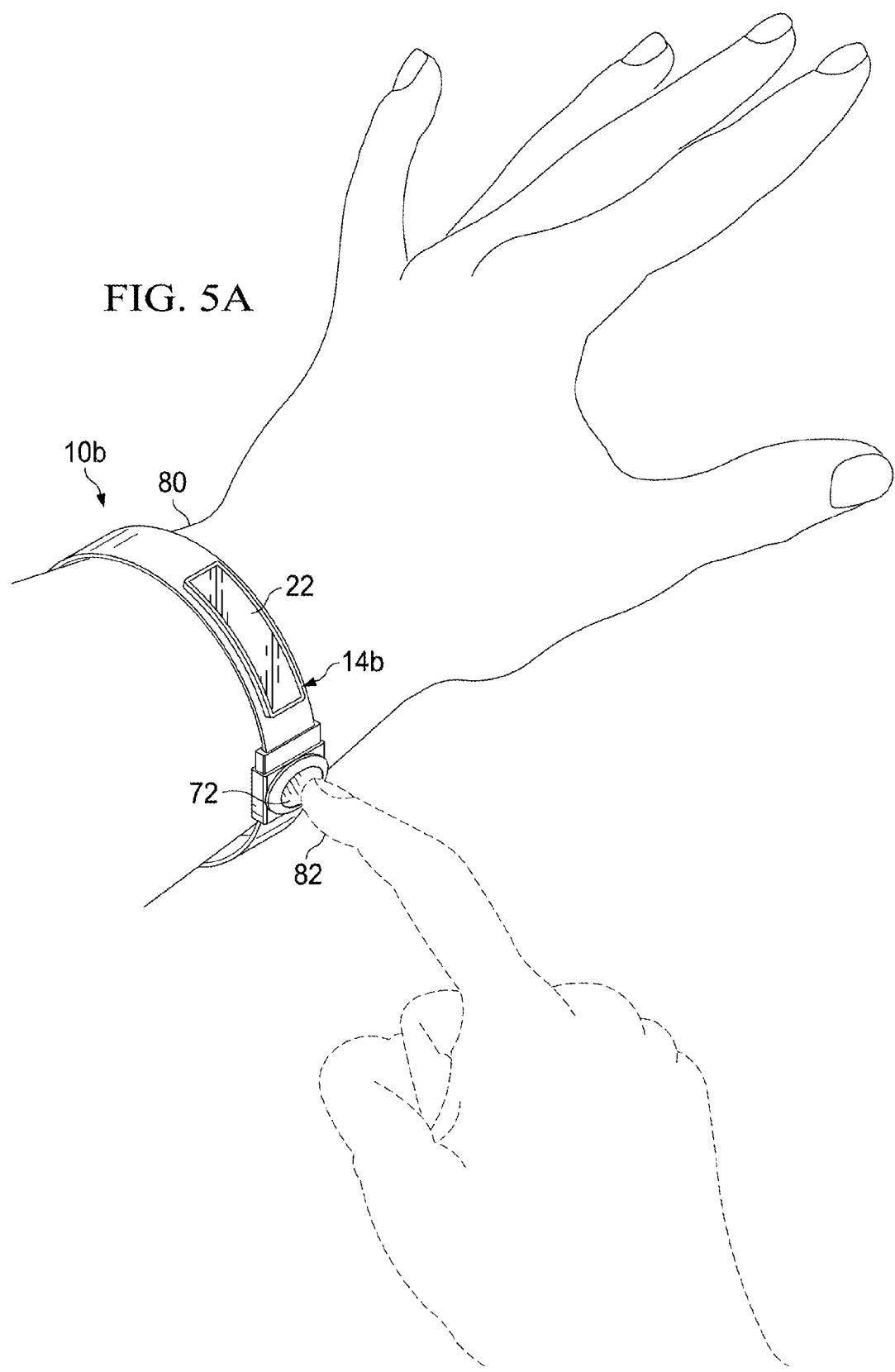

WEARABLE ELECTRONIC DEVICE HAVING A FINGERPRINT IDENTIFICATION DISPLAY

TECHNICAL FIELD

Embodiments described herein generally relate to a wearable electronic device having a fingerprint identification display.

BACKGROUND

End users have more electronic device choices than ever before. A number of prominent technological trends are currently afoot (e.g., mobile electronic devices, smaller electronic devices, increased user connectivity, etc.), and these trends are changing the electronic device landscape. One of the technological trends is wearable electronic devices, which can be worn by users. A wearable electronic device typically includes one or more applications or features that a user can access to use and interact with the wearable electronic device. Accessing the applications or features typically requires the user to log-in to the device before accessing the applications or features. The log-in can be performed at power-on for the device or to unlock the device. There are several options for logging-in to a device; however, nearly all of these require a user to interact with a specific area on a display of the device. Given the small form factor and limited display area of wearable electronic devices, some users experience inconvenience or discomfort during log-in. Hence, there is a desire to improve the means to log-in to a wearable electronic device.

Another of the technological trends is enhanced user mobility/connectivity through multiple electronic devices, sometimes referred to as an ecosystem. A user can be 'connected' (e.g., streaming music/videos, surfing the internet, messaging friends, reading emails, etc.) using multiple electronic devices in the ecosystem (e.g., wearable electronic device, phone, laptop, tablet, etc.). Typically, the user has to separately log-in to each of the multiple electronic devices in the ecosystem to use the devices, which can increase inconvenience for the user. Hence, there is a desire to improve the means for logging-in to multiple electronic devices in the ecosystem.

BRIEF DESCRIPTION OF THE DRAWINGS

Embodiments are illustrated by way of example and not by way of limitation in the FIGURES of the accompanying drawings, in which like references indicate similar elements and in which:

FIG. 1B is a simplified orthographic view illustrating an embodiment of a wearable electronic device, in accordance with one embodiment of the present disclosure;

FIG. 1C is a simplified orthographic partial view illustrating an embodiment of a wearable electronic device, in accordance with one embodiment of the present disclosure;

FIG. 1D is a simplified orthographic partial view illustrating an embodiment of a wearable electronic device, in accordance with one embodiment of the present disclosure;

FIG. 5A is a simplified orthographic view illustrating an embodiment of a wearable electronic device, in accordance with one embodiment of the present disclosure;

Figure 1A:
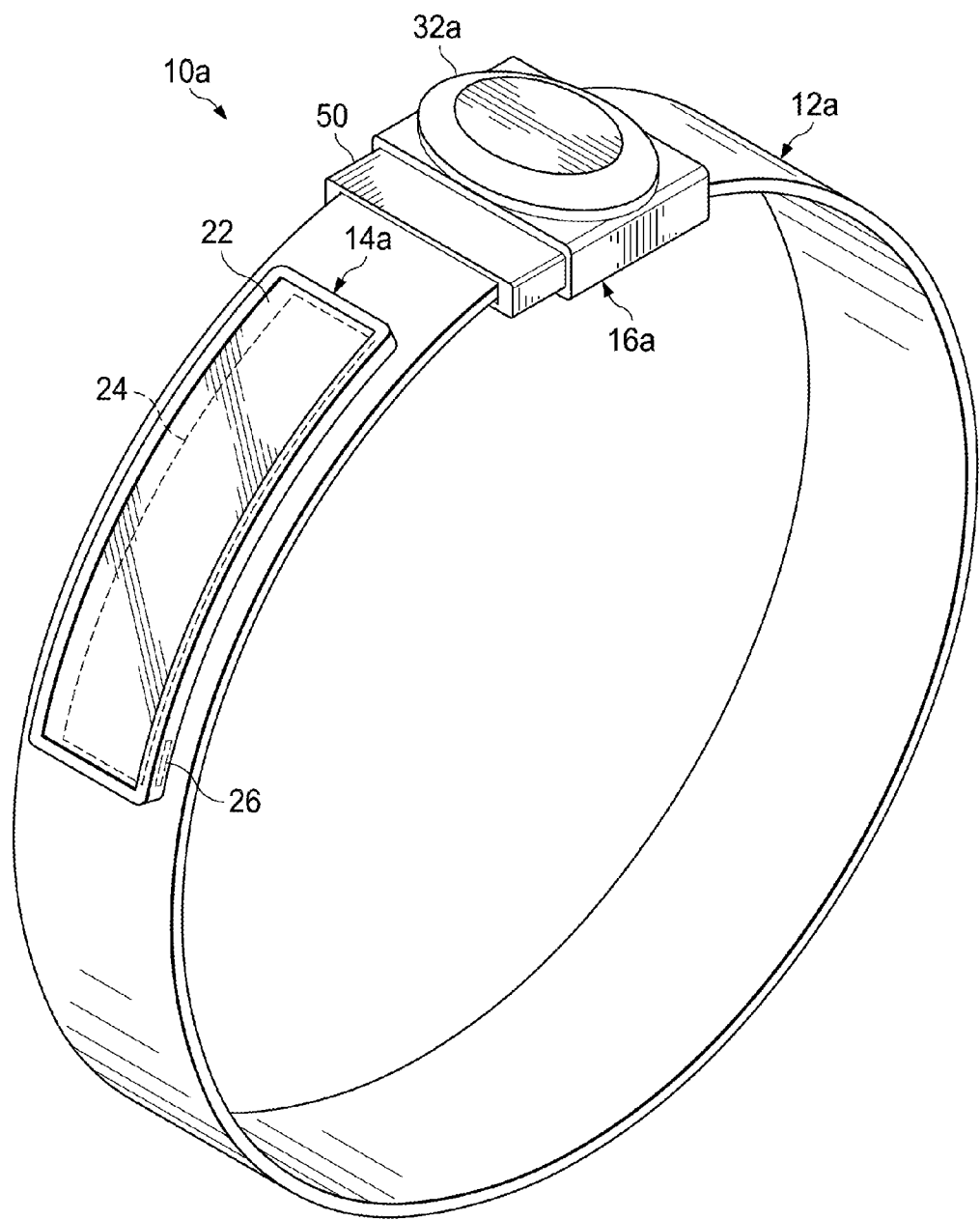
FIG. 1A is a simplified orthographic view illustrating an embodiment of a wearable electronic device, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include a strap portion and a first display portion included in the strap portion. The first display portion can include a main display and a first fingerprint sensor configured to capture one or more fingerprints placed on the main display at one or more capture locations. Note that, in at least one embodiment, the first fingerprint sensor can be further configured to capture one or more fingerprints in one or more capture orientations of one or more fingers of a user placed on the main display. In another embodiment, the strap portion is configured to wrap around a wrist of a user and wherein the main display and first fingerprint sensor are flexible to bend with the strap portion when the wearable electronic device is worn by the user.

Note that, in at least one embodiment, the strap portion can include a first end and a second end and the wearable electronic device can include a latch portion. The latch portion can include a latch control device provided to allow operation of the latch. In an embodiment a secondary display portion can be provided in the latch control device, which can includes a secondary display and a secondary fingerprint sensor configured to capture a fingerprint placed on the secondary display. In yet other embodiments, the wearable electronic device can include an inner strap display portion configured on an inner side of the strap portion. The inner strap display portion can include an inner strap display and an inner strap fingerprint sensor configured to capture one or more fingerprints placed on the inner strap display at one or more capture locations.

In other implementations, logic can be provided to capture one or more fingerprints of a user using the first fingerprint sensor, to determine an identity of the user using the one or more captured fingerprints and to log-in in the user to the wearable electronic device if the user is authorized to log-in to the wearable electronic device. In yet other implementations, the wearable electronic device can include wireless communication circuitry such that the wearable electronic device can communicate with one or more other electronic devices. In certain cases, to capture one or more fingerprints of a user using the first fingerprint sensor, to determine an identity of the user using the one or more captured fingerprints and to log-in the user to one or more of the other electronic devices that the user is authorized to log-in to using the wireless communication circuitry.

Example Embodiments

The following detailed description sets forth example embodiments of apparatuses, methods, and systems relating to fingerprint identification configurations for a wearable electronic device. Features such as structure(s), function(s), and/or characteristic(s), for example, are described with reference to one embodiment as a matter of convenience; various embodiments may be implemented with any suitable one or more of the described features.

FIG. 1A is a simplified orthographic view illustrating an embodiment of a wearable electronic device 10a in accordance with one embodiment of the present disclosure. Wearable electronic device 10a may include a strap portion 12a, a display portion 14a and a latch portion 16a. Display portion 14a can include a main display 22 and a fingerprint sensor 24.

In one or more embodiments, strap portion 12a may include a first end and a second end that may be coupled together using latch portion 16a, as discussed in further detail below to secure the wearable electronic device to a user (e.g., around a wrist, arm, etc. of the user). In one or more embodiments, strap portion 12a may be made of one or more materials including metal and metal alloys (e.g., stainless steel, aluminum, tin, iron, gold, silver, platinum, titanium, etc.), natural materials, synthetic fabrics, fibers and blends thereof (e.g., cotton, polyester, nylon, satin, silk, wool, leather, etc.), polymers, plastics, rubbers, elastics, elastomers, carbon fibers, injection molding, silicone, polycarbonates, vinyl, polypropylene, polystyrene, polyethylene combinations thereof or the like. In one or more embodiments, strap portion 12a may be of a solid unibody construction (as shown in FIG. 1A) or may include links, chains, cables, weaves, combinations thereof or the like. In some embodiments, wearable electronic device 10a can include a strap that is formed as a continuous strap without a latch portion. The ornamental design and material construction of strap portion 12a can be adjusted in any manner to suit any designer, manufacturer and/or vendor without departing from the scope of the embodiments described in the present disclosure.

Display portion 14a may be disposed within/on and/or supported by strap portion 12a. Main display 22 and fingerprint sensor 24 may be disposed within/on and/or supported by display portion 14a. In one or more embodiments, main display 22 is a screen that can be an organic light-emitting diode (OLED) display screen, transparent OLED display screen or any other suitable display screen system. Main display 22 may also be a touchscreen display, which may include a capacitive or resistive touchscreen layer over the screen of main display 22. In one or more embodiments, fingerprint sensor 24 may be an optical fingerprint sensor or a capacitive fingerprint sensor configured to capture one or more fingerprint images of one or more fingers of a user that may be placed on main display 22. As configured in conjunction with an optical fingerprint sensor, main display 22 may be transparent (e.g., transparent OLED, etc.) and fingerprint sensor 24 may be configured below main display 22. As configured in conjunction with a capacitive fingerprint sensor, main display 22 may be of any configuration (e.g., transparent or not transparent) and fingerprint sensor 24 may be configured above main display 22. In some embodiments, a capacitive fingerprint sensor and capacitive touch screen may be configured together as a single multi-function touch screen.

In general terms, optical fingerprint sensors project a light onto a finger using one or more light emitting elements and capture light reflected from the finger using a charge coupled devices (CCD). The captured light represents a fingerprint image of the fingerprint (e.g., ridges and valleys of the fingerprint). The captured light can be converted into a digital representation of the fingerprint image using an analog to digital converter (ADC) or other like device. Fingerprint sensors are also sometimes referred to as fingerprint scanners or fingerprint readers. Capacitive fingerprint sensors can measure changes in capacitance between ridges and valleys of a fingerprint that can be converted into corresponding data values representing the ridges/valleys of the fingerprint; thus, creating a digitized image of the fingerprint. A digitized fingerprint image of a user's fingerprint can be processed (e.g., using processors, logic, etc.) to determine identification information associated with the user, which may be used to identify the user.

In one or more embodiments, identification information can be determined using one or more image processing means or methods to determine ridge/valley information about the user's fingerprint. The ridge/valley identification information can be stored for later use, such as, for example, comparing ridge/valley identification information for a captured fingerprint to information associated with one or more stored fingerprints to determine if a user is authorized to log-in to the wearable electronic device 10a. In other embodiments, identification information can be determined by processing the fingerprint image according to one or more algorithms and storing one or more data points and/or metrics for the captured fingerprint that may be generated by the algorithms. To determine whether a user is authorized to log-in to wearable electronic device 10a, subsequently captured fingerprints may be processed according to the same one or more algorithms. The data point and/or metrics may be gathered from the captured fingerprints and compared to the stored data points and/or metrics for the user to determine if there is a match. In this manner, security of the actual fingerprints of the user can be maintained by not actually storing ridge/valley identification information for the user's fingerprints, but rather data points and/or metrics associated with the user's fingerprints.

It should be noted that a user can be 'identified' (e.g., identification information may be determined for the user) regardless of whether or not identification information is stored in wearable electronic device 10a. Determining an identity of a user, as referred to herein in the present disclosure, may refer to determining identification information for the user from one or more captured fingerprints for the user, which may represent the 'identity' of the user. Additional processes may be performed to determine if the identified user is authorized to log-in to wearable electronic device (e.g., by comparing identification for captured fingerprints to stored identification information). Virtually any other means and methods could be used to identify a user based on capturing one or more fingerprints of the user and, thus, are clearly within the scope of the present disclosure. As used herein in the present disclosure, capturing a fingerprint image may be referred to as capturing a fingerprint for one or more fingers of a user.

Display portion 14a, main display 22 and fingerprint sensor 24 may each be formed of flexible materials that may allow each to bend and flex in conjunction with the strap portion 12a when wearable electronic device 10a (and devices 10b, 10c and 10d, discussed below) may be worn by a user. Display portion 14a can be a rectangular shape (as shown in FIG. 1A), an elliptical shape or any other shape as determined by a designer or manufacturer. Display portion 14a, main display 22 and fingerprint sensor 24 may be sufficiently large to accommodate multiple fingers of a user that may be placed on main display 22. Fingerprint sensor 24 may be configured beneath main display 22 to scan the one or more fingers at any location and any orientation (e.g., direction of a finger) on main display 22.

Latch portion 16a may be located at a first end of the strap portion 12a and may facilitate coupling (e.g., fastening, locking, connecting, etc.) the first end to a second end in order to secure the wearable electronic device 10a to a user (e.g., wrist, arm, etc.). Latch portion 16a can include a latch control device 32a and a latch mechanism, which may be disposed within the latch portion 16a. The second end of the strap portion 12a can include a mating portion 50, which may be fed into the latch portion 16a and latched within the latch portion 16a using the latch control device 32a and latch mechanism. A user may use (e.g., turn, rotate, twist, push, etc.) the latch control device 32a to engage and/or disengage the latch mechanism within the latch portion 16a. The latch mechanism may be engaged to couple the first and second ends of the strap portion 12a together and disengaged to de-couple the ends from each other.

The latch mechanism is not shown in FIG. 1A for purposes of brevity, however, it should be understood that the latch mechanism within the latch portion 16a can be any suitable mechanism to secure the first and second ends of the strap portion 12a together. The mating portion 50 can be configured to include one or more mating elements to facilitate coupling with the latch mechanism in order to secure the first and second ends of the strap portion 12a together.

For example, in one embodiment, the latch mechanism may be a pin-type latch mechanism which may be configured to push one or more pin elements (e.g., pins, rods, bars, etc.) partially or fully through mating portion 50 when engaged using the latch control device 32a. In such an embodiment, mating portion 50 can be configured with, for example, receiving areas, holes, cutouts, etc. that may be configured to receive one or more pin elements within latch portion 16a. In another embodiment, for example, the latch mechanism may be a pressure-type latch mechanism which may be configured to apply pressure to one or more areas of mating portion 50 when engaged using latch control device 32a. The pressure may be applied using one or more pressure elements (e.g., rollers, balls, etc.). In such an embodiment, mating portion 50 can be configured with one or more pressure receiving areas (e.g., cutouts, holes, indentations, etc.) configured to receive corresponding pressure elements within latch portion 16a. In one or more embodiments, other latch mechanisms can include magnetic-type latch mechanisms, hook-type latch mechanisms, ratchet-type latch mechanisms, combinations thereof or the like.

In one or more embodiments, latch portion 16a and latch control device 32a may be made of one or more materials including metal and metal alloys (e.g., stainless steel, aluminum, tin, iron, gold, silver, platinum, titanium, etc.), polymers, plastics, rubbers, elastics, carbon fiber, neoprene, injection molding, combinations thereof or the like.

In one or more embodiments, display portion 14a can include a port 26 to facilitate charging a battery or capacitor, communication and/or control of the wearable electronic device 10a. For example, electrical current and signals can be passed through a plug-in connector (e.g., whose male side protrusion connects to port 26 and whose female side connects to a power device or another electronic device or vice-versa) or a wireless connector (e.g., WiFi, Bluetooth™, etc.) to recharge an on-board battery or capacitor and/or provide a communication path to electronics in wearable electronic device 10a. Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 10a. [Thunderbolt™ and the Thunderbolt logo are trademarks of Intel Corporation in the U.S. and/or other countries.]. Virtually any other electrical connection means and methods could be used and, thus, are clearly within the scope of the present disclosure. Port 26 may be configured on any side of display portion 14a. In one or more embodiments, the port can also be configured on any side of latch portion 16a. In some embodiments, wearable electronic device 10a may include charging contacts configured on display portion 14a and/or strap portion 12a, which can be used in combination with a charging device to facilitate charging a rechargeable battery within wearable electronic device 10a.

In one or more embodiments, wearable electronic device 10a can include wireless communication circuitry (e.g., Wi-Fi module, Bluetooth™ module, near field communication (NFC) module, or other wireless communication circuitry) to allow wearable electronic device 10a to communicate with one or more other electronic devices or a network through a wireless connection. The wireless connection may be any 3G/4G/LTE cellular wireless connection, WiFi/WiMAX connection, Bluetooth™ connection, or some other similar wireless connection. In an embodiment, a plurality of antennas can be provisioned in conjunction with wearable electronic device 10a, which may be associated with wireless connection activities.

Turning to FIG. 1B, FIG. 1B is a simplified orthographic view illustrating an embodiment of wearable electronic device 10a in accordance with one embodiment of the present disclosure. Wearable electronic device 10 may include strap portion 12a, display portion 14a, latch portion 16a at the first end of the strap portion and mating portion 50 at the second end of the strap portion. Mating portion 50, as shown in FIG. 1B, can include, for example, mating elements 52, which may be configured as holes extending partially through mating portion. In the present example, mating elements 52 may facilitate coupling the first and second ends of strap portion 12a together using a pin-type latching mechanism in latch portion 16a.

In one or more embodiments of wearable electronic device 10a (and 10b, 10c and 10d, discussed below) Strap portion 12a may have an overall length $L_{STRAP}$ ranging from approximately 5 inches to approximately 10 inches and a width $W_{STRAP}$ ranging from approximately 8 mm to approximately 65 mm. Display portion 14a may have an overall length $L_{DISP}$ that may have a ratio to $L_{STRAP}$, which may range from one-tenth to nine-tenths of the overall length of $L_{STRAP}$. Display portion 14a may have an overall width $W_{STRAP}$ having similar proportions to $W_{STRAP}$ as the length portions. In more general terms, strap portion 12a can be constructed having varying overall lengths to accommodate securing wearable electronic device 10a to a variety of different users, which may have a range of different body proportions, etc. and/or a variety of different user body parts (e.g., wrists, arms, etc.) which may have a range of different corresponding sizes. Further, it should be understood that dimensions may be changed by any designer as determined by one or more designs within the scope of the present disclosure. Although display portion 14a is illustrated as extending above a top surface of strap portion 12a, it should be understood that display portion 14a may also be flush or approximately flush with the top surface of strap portion 12a. Display portion 14a, main display 22 and fingerprint sensor 24 may be sufficiently large to accommodate multiple fingers of a user that may be placed on main display 22.

Turning to FIG. 1C, FIG. 1C is a simplified orthographic partial view illustrating an embodiment of wearable electronic device 10a in accordance with one embodiment of the present disclosure. Wearable electronic device 10a can include strap portion 12a, latch portion 16a and latch control device 32a in a locked configuration. A user may use (e.g., turn, rotate, twist, push, etc.) the latch control device 32a to engage and/or disengage the latch mechanism within the latch portion 16a. The latch mechanism may be engaged in FIG. 1C to facilitate coupling first and second ends of strap portion 12a together.

Turning to FIG. 1D, FIG. 1D is a simplified orthographic partial view illustrating an embodiment of wearable electronic device 10a in accordance with one embodiment of the present disclosure. Wearable electronic device 10a can include strap portion 12a, latch portion 16a and latch control device 32a in an unlocked configuration.

In general terms, wearable electronic device 10a can include a fingerprint capturing area accessible using one or more displays (e.g., main display 22), which may be configured to provide an area large enough to accommodate capturing one or more fingerprints from a user at one or more capture locations and orientations that may be convenient and accessible to a user that may be wearing the device. For example, the fingerprint capturing area of wearable electronic device 10a may be approximately equal to an active display area (e.g., active display area of main display 22) and may accommodate capturing fingerprints of the user at multiple capture locations for multiple orientations of one or more of the user's fingers.

For purposes of illustrating certain example features of electronic devices 10a, 10b, 10c and 10d the following foundational information may be viewed as a basis from which the present disclosure may be properly explained. There are various mechanisms through which a user can log-in or unlock a wearable electronic device to use and access applications and/or features of the device. For example, in one instance, a user can log-in to a wearable electronic device by placing a finger on a fingerprint sensor, which can capture the user's fingerprint. The user can be identified based on the fingerprint scan and logged-in to the device if the user is authorized to access the device. A username and password may be stored in the device and associated with the fingerprint in order to identify the user and log-in the user to the device. Fingerprint sensors for electronic devices are often limited to a single fingerprint capturing location and orientation (e.g., direction that a finger is placed on the sensor in order to capture a fingerprint). Given the small form-factor of wearable electronic devices, limiting fingerprint capturing to a single capturing location and orientation can be inconvenient to a user, can hinder the log-in or unlock process.

Particular embodiments described herein provide for a wearable electronic device, such as a bracelet, watch, wristband, armband, or other wearable device that includes a circuit board coupled to a plurality of electronic components (which includes any type of components, elements, circuitry, etc.). In certain embodiments, the circuit board may be a flexible printed circuit board. The wearable electronic device can include a fingerprint sensor that can be configured to capture one or more fingerprints at a plurality of locations and a plurality of orientations. By providing fingerprint capturing locations and orientations, the wearable electronic device effectively provides for capturing fingerprints in an "adjustable" manner such that a user may choose where to place one or more fingers on the one or more displays that are convenient to the user. Further, by providing for capturing multiple fingerprints of multiple fingers, the wearable electronic device may provide for improved biometric security for logging-in to the wearable electronic device. For example, multiple fingerprints of a user may be required to log-in to the wearable electronic device.

Moreover, by providing for capturing multiple fingerprints of multiple fingers, either simultaneously or alone, the wearable electronic device may provide for logging-in to and interacting with and/or controlling other electronic devices within an ecosystem that the wearable electronic device may be in communication with through a wireless connection. In one or more embodiments, the other electronic devices may be laptops, mobile phones, tablets, phablets, all-in-one or any other electronic device that a user can access using a wireless connection and log-in information The other electronic devices would otherwise have to be logged-in to separately by the user. For example, an index finger fingerprint of a user may be associated with log-in information for the wearable electronic device and a thumb fingerprint may be associated with log-in information for the user's mobile phone. By placing the user's index finger and thumb on the display and capturing the corresponding fingerprints for these fingers, the user may be logged-in to the wearable electronic device and the mobile phone. Thus, the wearable electronic device may be a wearable cloud for communicating with an ecosystem of other electronic devices.

These examples are only a few of the many other possibilities for utilizing the increased fingerprint capturing area in order to log-in the user to the wearable electronic device and/or other electronic devices. Virtually any other methods or means to capture one or more fingerprints, together simultaneously, separately in a particular sequence, alone or in any other manner may be used to log-in the user to the wearable electronic device and/or other electronic devices and, thus, are clearly within the scope of the present disclosure.

In use, a user can register one or more fingerprints with the wearable electronic device 10a and associate the one or more fingerprints with log-in information for the wearable electronic device 10a and/or other electronic devices (e.g., mobile phones, tablets, phablets, laptops, etc.). For example, in one embodiment, the user can connect to wearable electronic device 10a using a laptop or other computing device (e.g., through a wireless or wired connection) and register the one or more fingerprints and associated log-in information with the wearable electronic device, which may be stored in memory within the device 10a. In one or more embodiments, the log-in information can include a username and password for the user that may be associated with the device 10a, a passkey, a personal identification number (PIN)code, a passcode, combinations thereof, or the like. Registering the fingerprint may refer to capturing the one or more fingerprints and storing identification information associated with the user using the one or more captured fingerprints.

To log-in to the wearable electronic device 10*a* (e.g., when the device may be in a locked-mode or at power-on), the user may place one or more fingers on main display 22. In an embodiment, control logic in wearable electronic device 10*a* can determine if the user is touching main display 22 (e.g., in combination with a touch screen and associated sensors) and may control fingerprint sensor 24 to capture one or more fingerprints for the user's one or more fingers. The control logic may include means to determine the orientation of the captured one or more fingerprints and may re-orient the captured fingerprints to a default orientation using one or more image processing techniques for further processing. For example, orientation may be determined based on variations in size of a fingerprint (e.g., varying width from tip to base, determination of the predominant organization/direction of ridges and valleys, etc.) and re-oriented accordingly for further processing. Additional logic (e.g., detection logic, system logic, etc.) in wearable electronic device 10*a* may process the one or more captured fingerprints to determine an identity of the user. This can include determining an identity for the user based on identification information determined from the fingerprint, such as ridge/valley identification information of the fingerprint, data point and/or metric identification information of the fingerprint determined from one or more algorithms, etc. Determining the user's identity can be performed using one or more algorithms. The identity of the user can be represented by the identification information. The logic can compare the user's identity (e.g., identification information) to one or more identities that may be stored in wearable electronic device 10 to determine if the user is authorized to log-in to the device (e.g., if there is a match). The logic can log-in the user to the wearable electronic device 10*a* using the stored log-in information associated with the wearable electronic device 10*a* if the user is authorized to log-in to the device.

Once logged-in to wearable electronic device 10*a*, a user can use and access features, applications, etc. associated with wearable electronic device 10*a*. The user may use and access the features applications, etc. using main display 22 (e.g., touching display if a touch screen is configured for the device), speaking commands to the device, performing gestures over main display 22 (e.g., if wearable electronic device include gesture recognition electronics and logic) or otherwise interacting with the device to control and use the device.

Additionally, if the user registers one or more fingerprints and associates the one or more fingerprints with log-in information (e.g., username and password, passcode, passkey, PIN code, etc.) for one or more other electronic devices, the logic can compare the user's identity (e.g., identification information) to one or more identities that may be stored in wearable electronic device 10*a* to determine if the user is authorized to log-in to the one or more other electronic devices. In one or more embodiments, the other electronic devices may be laptops, mobile phones, tablets, phablets, all-in-one or any other electronic device that a user may access using a wireless connection and log-in information. If the logic determines a match it can communicate with the other electronic devices (e.g., using wireless communication circuitry in wireless module 28) to log-in the user to the devices using the associated log-in information for the devices. In one or more embodiments, the user may interact with and/or control the other devices once logged-in.

In some embodiments, a user may also log-in to wearable electronic device 10*a* and/or other electronic devices using one or more voice commands, which may be received by a microphone in wearable electronic device 10*a*, interpreted and verified using one or more processors, logic, software, etc. that may be capable of voice recognition and may log-in the user to wearable electronic device 10*a*. In one or more embodiments, a user may register one or more voice commands, e.g., 'log-in John', which can be used to log-in the user to wearable electronic device 10*a*.

In one or more embodiments, main display 22 may be activated in combination with and/or just prior to capturing one or more fingerprints of the user to generate feedback for the user on main display 22. In one or more embodiments, the feedback may indicate to the user that a capture is about to begin, a status message indicating a percentage of capture that may be occurring for a fingerprint, which of one or more fingerprints may be currently being captured, an alert that a log-in has failed or other like information. In one or more embodiments, feedback may be displayed at or near a fingerprint that is being captured. In one or more embodiments, feedback can also be generated using other techniques. For example, the feedback can also be haptic feedback generated for the user through one or more haptic elements (e.g., linear resonant actuators (LRAs), eccentric rotating mass (ERM) actuators, piezoelectric elements, etc.). For example, one or more haptic effects may be generated if a log-in succeeds for a user or after one or more fingerprint captures may be completed. In one or more embodiments, audio feedback may also be generated for the user.

In some embodiments, main display 22 can be activated by touching main display 22, which can include a touch screen and one or more touch sensors. In another embodiment, main display 22 can be activated by speaking commands into a microphone configured in wearable electronic device 10*a* that may be coupled to corresponding electronics and/or voice recognition logic to process and control device 10*a* according to the commands. In other embodiments, main display 22 can be activated by pressing a button that may configured on wearable device that may be coupled to electronics and/or logic to process and control device 10*a* according the button press. These example embodiments are only a few of the many other methods or means that can be used to activate main display 22 and/or generate feedback to the user. Virtually any other methods or means may be used to activate main display and/or provide feedback to the user and, thus, are clearly within the scope of the present disclosure.

In one or more embodiments, wearable electronic device 10*a* (and 10*b*, 10*c*, and 10*d*, discussed below) is an electronic bracelet, watch, wristband or armband. In still other embodiments, electronic device 10*a* (and 10*b*, 10*c* and 10*d*) may be any suitable electronic device having a display such as a mobile device, a tablet computer and/or a tablet device (e.g., i-Pad™), phablet, a personal digital assistant (PDA), a smartphone, an audio system, a movie player of any type, or other device that includes a circuit board coupled to a plurality of electronic components (which includes any type of components, elements, circuitry, etc.). In one or more embodiments, electronics (e.g., processors, controllers, memory, etc.) for wearable electronic device 10*a* may reside in display portion 14*a*, latch portion 16*a* or combinations thereof. In another embodiment, electronics (e.g., processors, controllers, memory, etc.) can also reside in strap portion 12*a*. In an embodiment, wearable electronic device 10*a* may contain a camera, a microphone, and speakers. In an embodiment, electronics and/or logic within latch portion 16*a* can determine whether the latching mechanism is engaged and may provide power to display 22 and fingerprint sensor 24 if the mechanism is engaged.

In at least one example embodiment, the circuit board of wearable electronic device 10*a* is a general circuit board that can hold various components of an internal electronic system of wearable electronic device 10*a*. The components may include a central processing unit (CPU), a memory, etc. The circuit board can also couple to one or more connectors in order to accommodate other peripherals sought to be used by a user of wearable electronic device 10*a*. More specifically, the circuit board can provide the electrical connections by which the other components of the system can communicate.

Any processors (inclusive of digital signal processors, microprocessors, supporting platform hardware, etc.), memory elements, etc. can be suitably coupled to the circuit board based on particular configuration needs, processing demands, electronic device designs, etc. Note that particular embodiments of the present disclosure may readily include a system on chip (SOC) central processing unit (CPU) package. An SOC represents an integrated circuit (IC) that integrates components of a computer or other electronic system into a single chip. The chip may contain digital, analog, mixed-signal, and often radio frequency functions: all of which may be provided on a single chip substrate.

Note also that particular embodiments of the present disclosure may include logic that can be implemented in a variety of manners. For example, logic can be implemented in software, which may mean that a processor may be instructed to control fingerprint sensor 24 to capture one or more fingerprints of a user, to verify if the user is authorized to log-in the wearable electronic device 10*a*, etc. In another example, logic can be implemented in firmware that a separate device may utilize. In yet another example, logic can be implemented as a standalone hardware chip controller.

Figure 2:
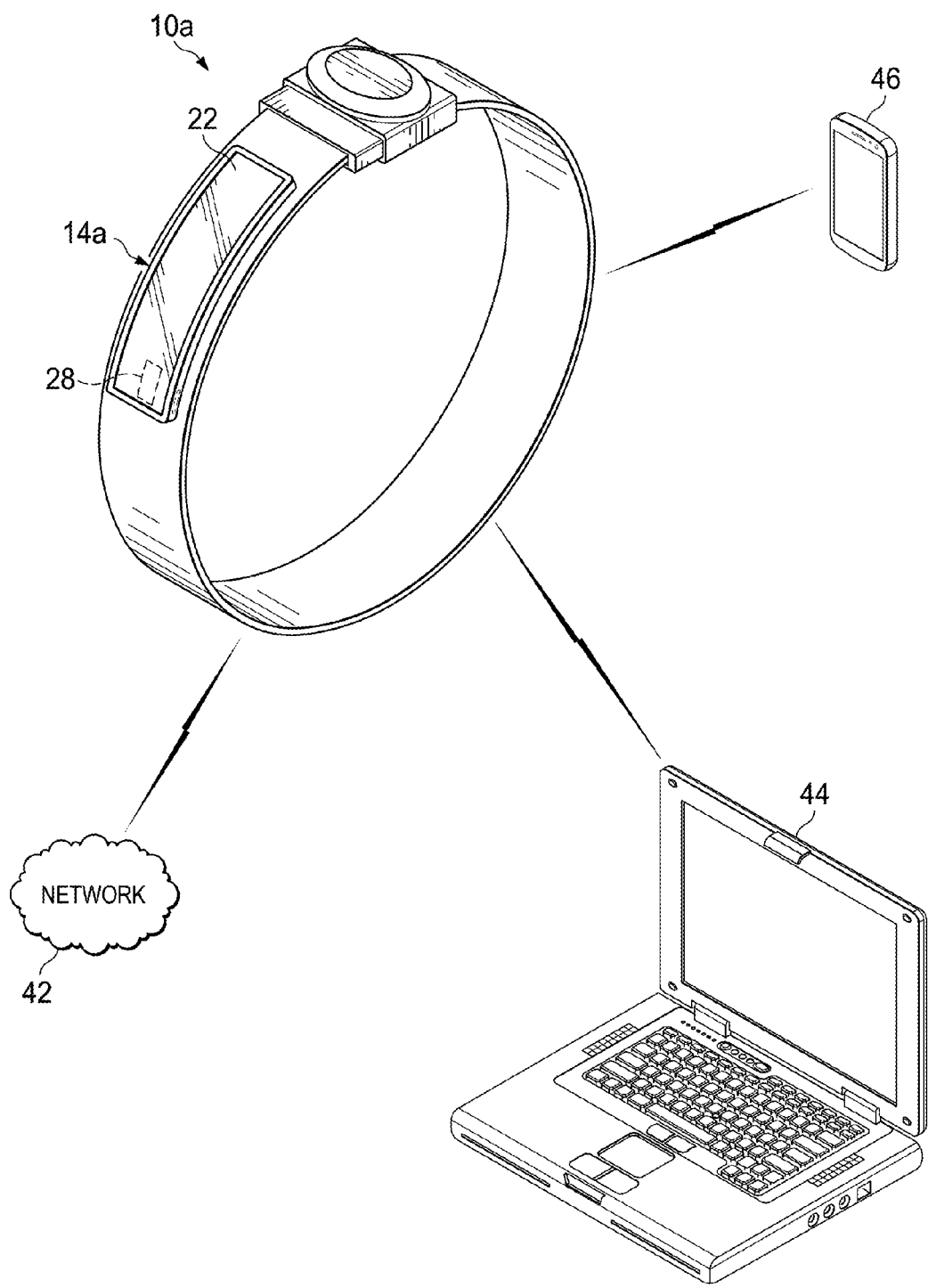
FIG. 2 is a simplified block diagram illustrating an embodiment of a wearable electronic device, in accordance with one embodiment of the present disclosure.

Turning to FIG. 2, FIG. 2 is a simplified block diagram illustrating an embodiment of wearable electronic device 10*a* in accordance with one embodiment of the present disclosure. Wearable electronic device 10*a* has its ends coupled together in the configuration shown in FIG. 2. Wearable electronic device 10*a* can include display portion 14*a*, which can include main display 22 and a wireless module 28. Wireless module 28 (e.g., Wi-Fi module, Bluetooth™ module, WiDi module, NFC module or other wireless communication circuitry) may allow wearable electronic device 10*a* to communicate with a network 42, a first electronic device 44 and a second electronic device 46 through a wireless connection.

The wireless connection may be any 3G/4G/LTE cellular wireless, WiFi/WiMAX connection, Bluetooth™ connection, NFC connection or some other similar wireless connection. In an embodiment, the wireless connection may be a wireless personal area network (WPAN) to interconnect wearable electronic device to network 42, first electronic device 44 and/or second electronic device 46 within a relatively small area (e.g., Bluetooth™, invisible infrared light, Wi-Fi, WiDi, etc.). In another embodiment, the wireless connection may be a wireless local area network (WLAN) that links wearable electronic device to network 42, first electronic device 44 and/or second electronic device 46 over a relatively short distance using a wireless distribution method, usually providing a connection through an access point for Internet access. The use of spread-spectrum or OFDM technologies may allow wearable electronic device to move around within a local coverage area, and still remain connected network 42, first electronic device 44 and/or second electronic device 46.

Network 42 may be a series of points or nodes of interconnected communication paths for receiving and transmitting packets of information that propagate through network 42. Network 42 offers a communicative interface and may be any local area network (LAN), wireless local area network (WLAN), metropolitan area network (MAN), Intranet, Extranet, WAN, virtual private network (VPN), or any other appropriate architecture or system that facilitates communications in a network environment. Network 42 can comprise any number of hardware or software elements coupled to (and in communication with) each other through a communications medium. First electronic device 44 and second electronic device 46 may be a computer (e.g., notebook computer, laptop, tablet computer or device), a phablet, a cellphone, a personal digital assistant (PDA), a smartphone, an audio system, a movie player of any type, router, access point, or other device that includes a circuit board coupled to a plurality of electronic components (which includes any type of components, elements, circuitry, etc.).

As noted, by capturing multiple fingerprints of multiple fingers together simultaneously, alone or in a specific sequence, wearable electronic device 10*a* (and 10*b*, 10*c* and 10*d* discussed below) may provide for logging-in to other electronic devices (e.g., first and second electronic device 44, 46) within an ecosystem that wearable electronic device 10*a* may be interconnected with through a wireless connection. In one or more embodiments, first and second electronic device 44, 46 may be laptops, mobile phones, tablets, phablets, all-in-one or any other electronic device that a user can access using a wireless connection and log-in information. Wearable electronic device 10*a* may be a wearable cloud for communicating with the other surrounding electronic devices. For example an index finger and a middle finger in combination may be used to log-in to first electronic device 44 and the index finger and a thumb in combination may be used to log-in to second electronic device 46. In another example, the index finger alone may be used to log-in to wearable electronic device, the middle finger alone may be used to log-in to first electronic device 44 and the thumb alone may be used to log-in to second electronic device 46. The fingers can be placed on main display alone or together in order to capture fingerprints of the fingers and log-in to first and second electronic devices 44, 46.

To log-in a user to one or more other electronic devices, wearable electronic device 10*a* may first attempt to establish a wireless connection with the other wearable electronic device. In one or more embodiments, this can include establishing a Bluetooth™ connection with the one or more other electronic devices. To establish a Bluetooth™ connection, wearable electronic device 10*a* may attempt to pair to another electronic device (e.g., first electronic device 44 and/or second electronic device 46) using a PIN code specific to the other device, which can be configured by a user. During the pairing process, each wearable electronic device 10*a* may exchange a link-key with another electronic device to establish a secure connection between the devices. Link-keys are typically 48 HEX digit-based encrypted codes, which allow electronic devices to establish a secure Bluetooth™ connection. If the link-key exchange is successful (and an appropriate PIN code has been established between the devices), wearable electronic device 10*a* may connect to the other electronic device (e.g., e.g., first electronic device 44 and/or second electronic device 46).

Once connected, wearable electronic device may log-in the user to the other electronic device using corresponding log-in information stored in wearable electronic device 10*a* that has been associated with one or more corresponding fingerprints captured and identified by wearable electronic device 10a that may be used log-in to the other electronic device. In one or more embodiments, once logged-in to another electronic device, the user may access and use certain features of the other electronic device over the wireless connection established with the other electronic device. In one or more embodiments, this may include but not be limited to, communicating information between the devices such as music, videos, files, or other such information. In one or more embodiments, wearable electronic device 10a may be configured software and/or other programs that may enable wearable electronic device 10a to navigate a file system of other electronic devices, access applications of other electronic devices (e.g., music player, video player, photo viewer, etc.).

In one or more embodiments, an attempt to connect may time-out due to a connection being dropped, the other electronic device being powered off, interference or other disruption. In one or more embodiments, wearable electronic device 10a may attempt to re-connect to the other electronic devices a predetermined number of times before ceasing log-in attempts. In one or more embodiments, the number of re-connect attempts may be configurable for wearable electronic device 10a or may be set by an equipment manufacturer.

Establishing a wireless connection with another electronic device using Bluetooth™ is only one example in which a connection may be established with other electronic devices. In one or more embodiments, a wireless connection may be established with other electronic devices using a Wi-Fi/WiMAX connection or any other 802.11 protocol wireless connection, or in some embodiments, a NFC connection (e.g., by tapping another electronic device). The examples provided above are only a few of the many means and methods that can be used to log-in a user to another electronic device. Virtually any other means and methods can be used, and, thus, are clearly within the scope of the present disclosure.

Wearable electronic device 10a may include one or more memory elements (e.g., a subscriber identity module (SIM), random access memory (RAM), dynamic random access memory (DRAM), synchronous dynamic random access memory (SDRAM), flash memory, etc.), which may be configured to store user preferences, fingerprint/user identification information, phone numbers, network keys, Bluetooth™ personal identification number (PIN) code, Bluetooth™ link-key, etc. as well as username and password log-in information, other PIN code, passkeys, etc. for wearable electronic device 10a and/or other electronic devices (e.g., laptop, mobile phone, tablet, all-in-one, etc.) that a user may log-in to and access using wearable electronic device 10a.

Figure 3A:
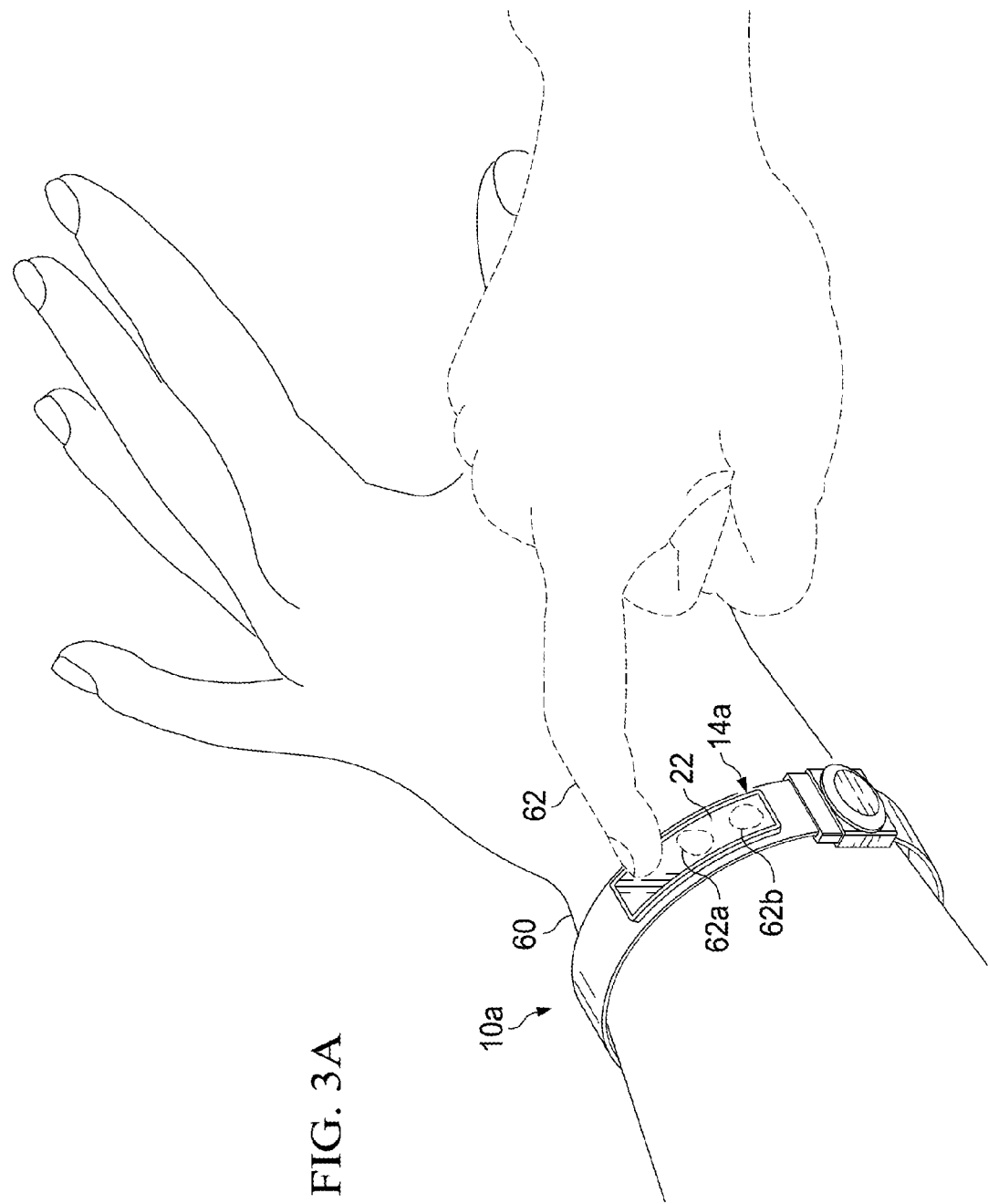
FIG. 3A is a simplified orthographic view illustrating an embodiment of a wearable electronic device, in accordance with one embodiment of the present disclosure.

Turning to FIG. 3A, FIG. 3A is a simplified orthographic partial view illustrating an embodiment of wearable electronic device 10a in accordance with one embodiment of the present disclosure. As illustrated in FIG. 3A, wearable electronic device 10a may be worn on a user's wrist 60. Wearable electronic device 10a may include display portion 14a. Display portion 14a may include main display 22. Fingerprint sensor 24 is not shown in FIG. 3A in order to illustrate other features of wearable electronic device 10a, but may be used to facilitate capturing one or more fingerprints of the user.

For FIG. 3A, the user may register the fingerprint of an index finger 62 with associated log-in information for wearable electronic device. The user may use the index finger 62 to log-in to wearable electronic device 10a, which may capture a fingerprint of the index finger 62, determine the user's identity from the captured fingerprint and log-in the user to wearable electronic device 10a (e.g., the user's identification information matches stored identification information and associated log-in information that was registered by user).

Other fingerprint placements and orientations (shown by dashed lines 62a and 62b) are shown in FIG. 3A to illustrate other possible locations and orientations that can be used to capture a fingerprint of the index finger 62.

Figure 3B:
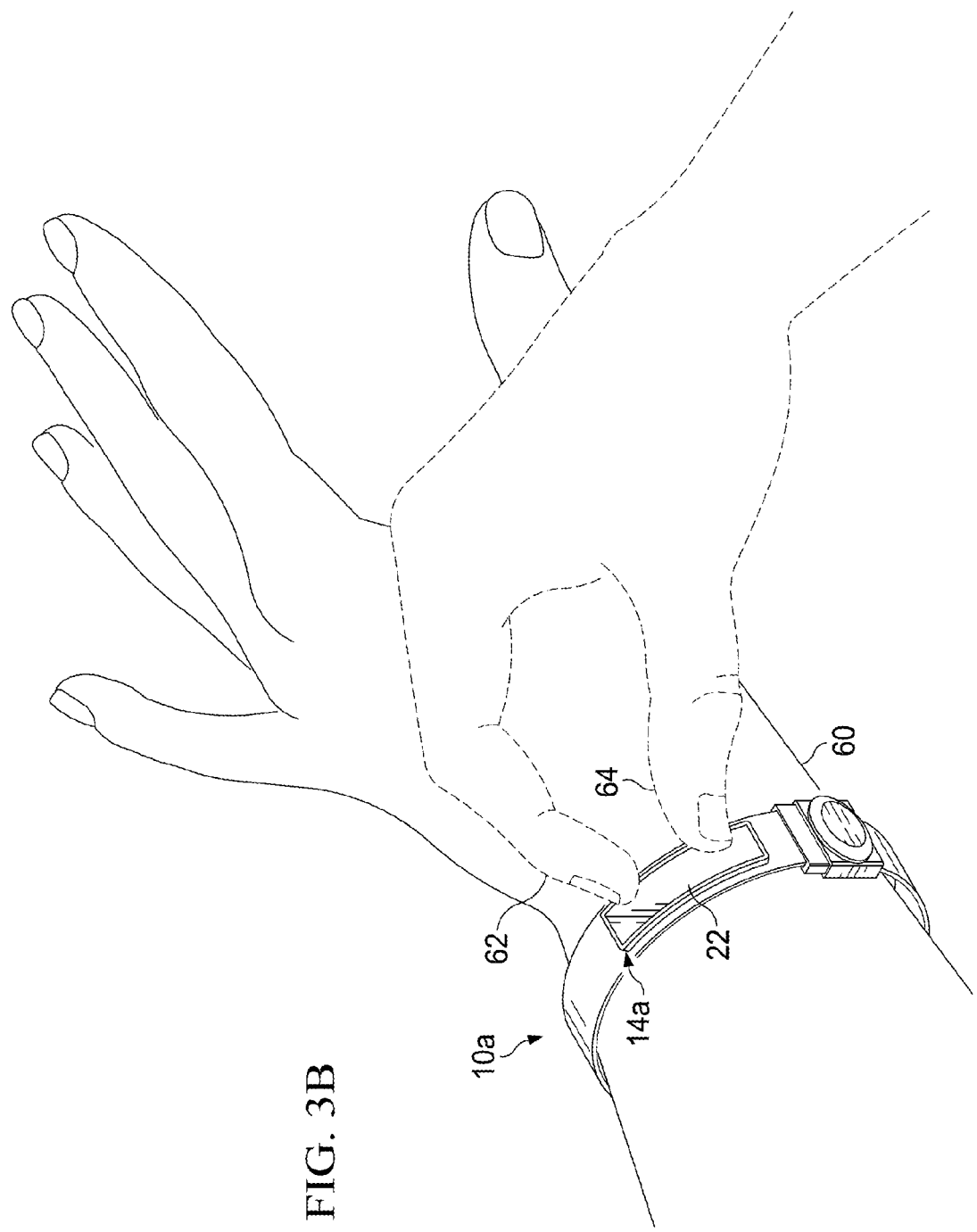
FIG. 3B is a simplified orthographic view illustrating an embodiment of a wearable electronic device, in accordance with one embodiment of the present disclosure.

Turning to FIG. 3B, FIG. 3B is a simplified orthographic partial view illustrating an embodiment of wearable electronic device 10a in accordance with one embodiment of the present disclosure. As illustrated in FIG. 3B, wearable electronic device 10a may be worn on user's wrist 60. Wearable electronic device 10a may include display portion 14a. Display portion 14a may include main display 22. Fingerprint sensor 24 is not shown in FIG. 3B in order to illustrate other features of wearable electronic device 10a, but may be used to facilitate capturing one or more fingerprints of the user.

For FIG. 3B, the user may register the fingerprint of the index finger 62 and a thumb with associated log-in information for wearable electronic device. The user may use index finger 62 and a thumb 64 to log-in to wearable electronic device 10a, which may capture a fingerprint of the index finger 62 and thumb 64, determine the user's identity from the captured fingerprint and thumb and log-in the user to wearable electronic device 10a log-in to wearable electronic device 10a (e.g., the user's identification information matches stored identification information and associated log-in information that was registered by user).

Figure 4:
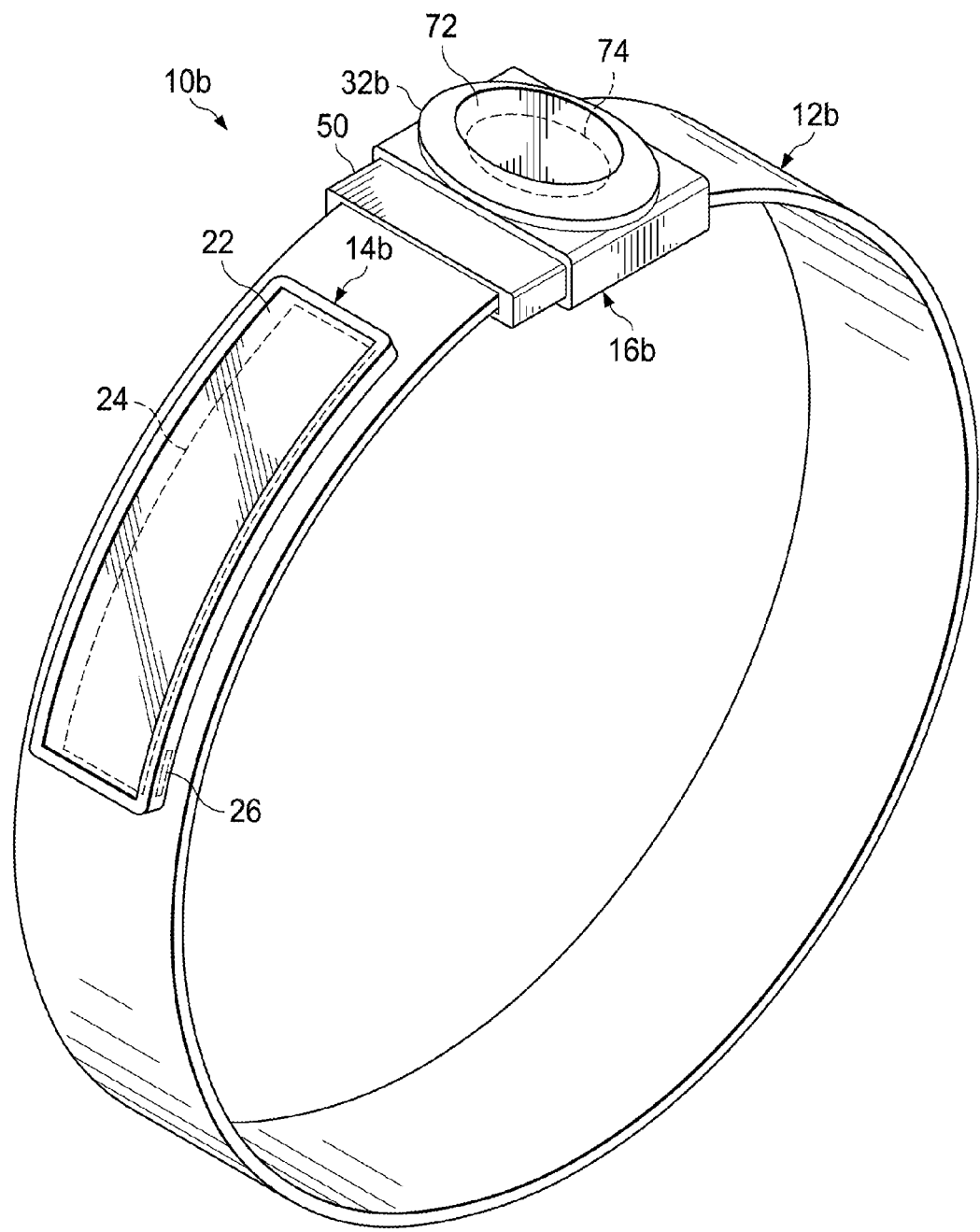
FIG. 4 is a simplified orthographic view illustrating an embodiment of a wearable electronic device, in accordance with one embodiment of the present disclosure.

Turning to FIG. 4, FIG. 4 is a simplified orthographic view illustrating an embodiment of a wearable electronic device 10b in accordance with one embodiment of the present disclosure. Wearable electronic device 10b can include a strap portion 12b, a display portion 14b and a latch portion 16b. Display portion 14b can include main display 22 and fingerprint sensor 24. In one or more embodiments, display portion can also include port 26.

Latch portion 16b can include a latch control device 32b, which can include a secondary display 72 and a secondary fingerprint sensor 74. Wearable electronic device 10b is similar to wearable electronic device 10a shown in FIG. 1A with the addition of secondary display 72 and secondary fingerprint sensor 74. Secondary display 72 and secondary fingerprint may provide an additional fingerprint capturing area to capture a fingerprint of a user, which may improve convenience for user to log-in to wearable electronic device 10b and/or one or more other electronic devices. In one or more embodiments, latch portion 16b can include electronics (e.g., processors, controllers, memory, etc.) for electronics in latch portion 16b or these may be distributed across display portion 14b and strap portion 12b.

Turning to FIG. 5A, FIG. 5A is a simplified orthographic partial view illustrating an embodiment of wearable electronic device 10b in accordance with one embodiment of the present disclosure. As illustrated in FIG. 5A, wearable electronic device 10b may be worn on a user's wrist 80. Wearable electronic device 10b may include display portion 14b, which may include main display 22, latch portion 16b and latch control device 32b, which may include secondary display 72. Fingerprint sensor 24 and secondary fingerprint sensor 74 are not shown in FIG. 5A in order to illustrate other features of wearable electronic device 10b, but may be used to facilitate capturing one or more fingerprints of the user.

For FIG. 5A, the user may register the fingerprint of an index finger 82 with associated log-in information for wearable electronic device 10b. The user may use the index finger 82 to log-in to wearable electronic device 10b by placing the index finger 82 on secondary display 72. A fingerprint of the index finger 82 may be captured using the secondary fingerprint sensor. The user's identity may be determined from the captured fingerprint and log-in the user to wearable electronic device 10*b* (e.g., the user's identification information matches stored identification information and associated log-in information that was registered by user). The user may place index finger 82 (or any other registered finger) in any orientation on secondary display 72 for the fingerprint to be captured. One or more fingers may also be registered with associated log-in information for one or more other devices.

Figure 5B:
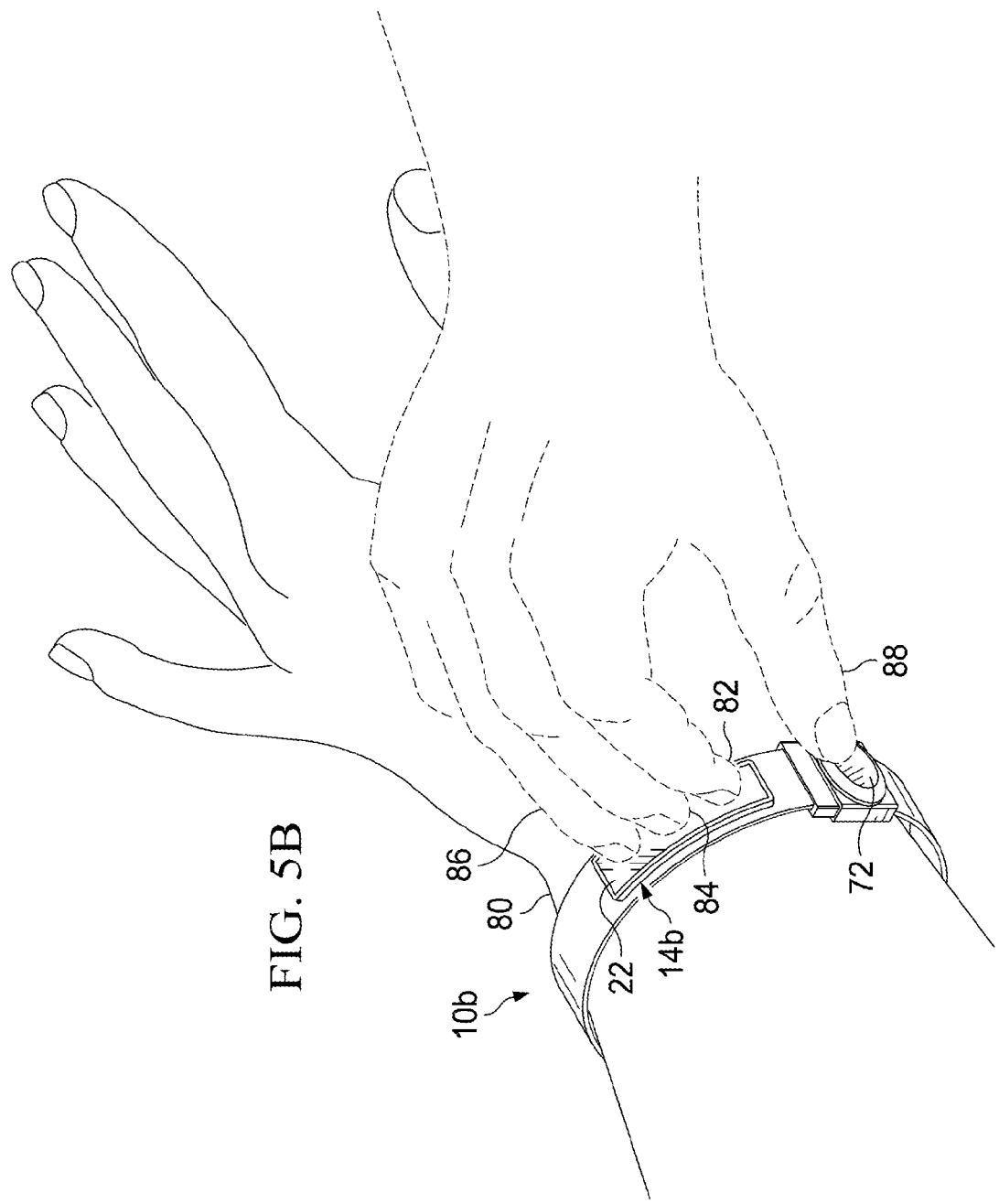
FIG. 5B is a simplified orthographic view illustrating an embodiment of a wearable electronic device, in accordance with one embodiment of the present disclosure.

Turning to FIG. 5B, FIG. 5B is a simplified orthographic partial view illustrating an embodiment of wearable electronic device 10*b* in accordance with one embodiment of the present disclosure. As illustrated in FIG. 5B, wearable electronic device 10*b* may be worn on user's wrist 80. Wearable electronic device 10*b* may include display portion 14*b*, which may include main display 22, latch portion 16*b* and latch control device 32*b*, which may include secondary display 72. Fingerprint sensor 24 and secondary fingerprint sensor 74 are not shown in FIG. 5B in order to illustrate other features of wearable electronic device 10*b*, but may be used to facilitate capturing one or more fingerprints of the user.

For FIG. 5B, the user may register the fingerprint of index finger 82, a middle finger 84, a ring finger 86 and a thumb 88 with associated log-in information for wearable electronic device 10*b*. The user may use these fingers to log-in to wearable electronic device 10*b* by, for example, placing thumb 88 on secondary display 72 and index finger 82, middle finger 84 and ring finger 86 on main display 22 to log-in to wearable electronic device 10*b*. A fingerprint of thumb 88 may be captured using the secondary fingerprint sensor and a fingerprint of index finger 82, middle finger 84 and ring finger 86 may be captured using the fingerprint sensor in display portion 14*b*. The user's identity may be determined from the captured fingerprints and log-in the user to wearable electronic device 10*b* (e.g., the user's identification information matches stored identification information and associated log-in information that was registered by user). The user may place index finger 82 (or any other registered finger) in any orientation on secondary display 72 for the fingerprint to be captured In one or more embodiments, the user may place the fingers on main display 22 and/or secondary display 72 individually in a predetermined sequence or a random sequence to log-in to wearable electronic device. A particular sequence of capturing fingerprints can be registered with wearable electronic device 10*b*. In one embodiment, wearable electronic device 10*b* can prompt the user to apply a particular finger for the particular sequence during a log-in procedure or can merely prompt the user to 'apply another finger' to step through a random sequence.

Figure 6:
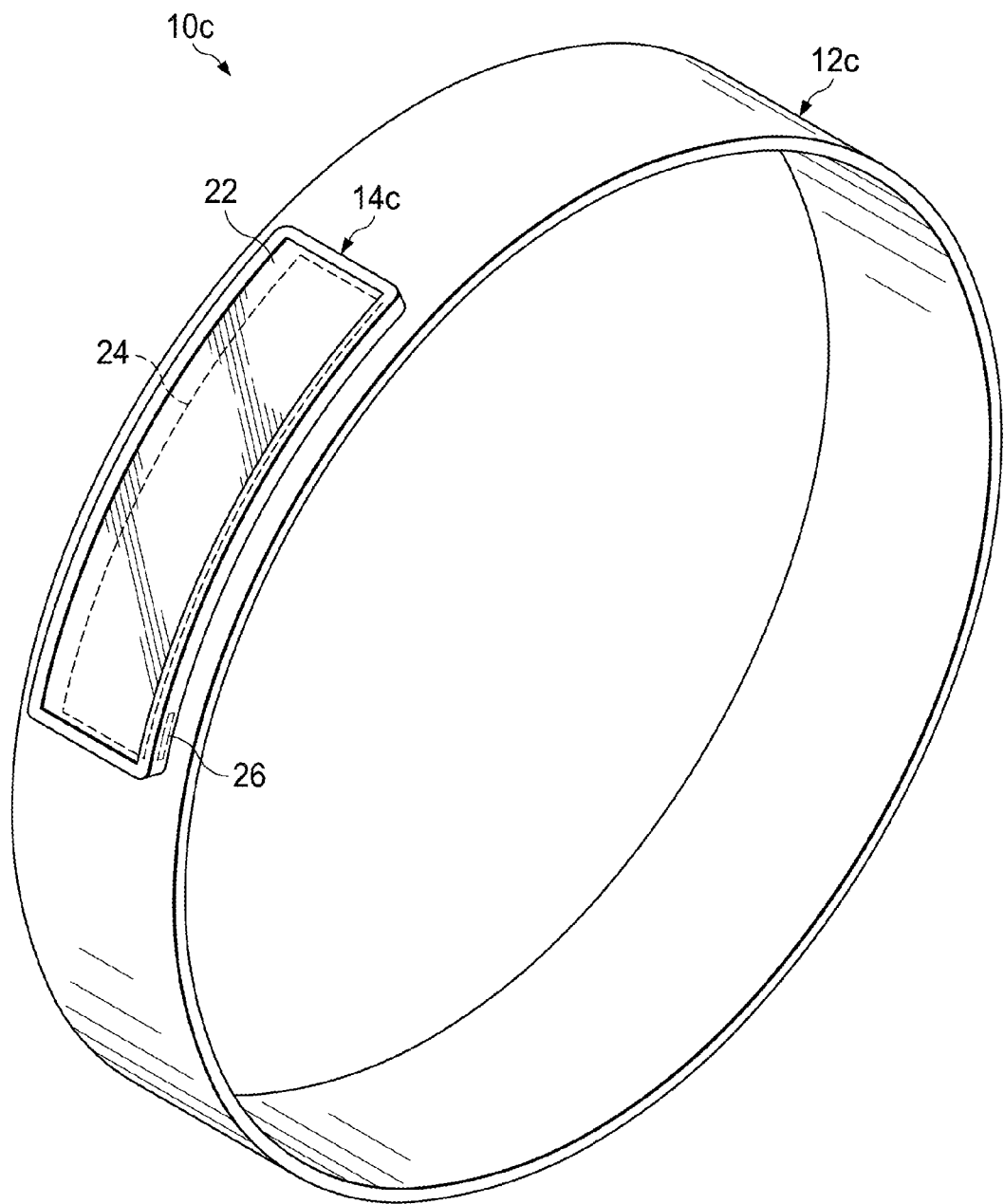
FIG. 6 is a simplified orthographic view illustrating an embodiment of a wearable electronic device, in accordance with one embodiment of the present disclosure.

Turning to FIG. 6, FIG. 6 is a simplified orthographic view illustrating an embodiment of a wearable electronic device 10*c* in accordance with one embodiment of the present disclosure. Wearable electronic device 10*c* can include a strap portion 12*c* and a display portion 14*b*. Display portion 14*b* can include main display 22 and fingerprint sensor 24. In one or more embodiments, display portion can also include port 26. Wearable electronic device 10*c* is similar to wearable electronic device 10*a* shown in FIG. 1A except that wearable electronic device 10*c* does not include a latch portion.

Strap portion 12*c*, as shown in FIG. 6, may be of a continuous construction, which may not be latched together. In one or more embodiments, strap portion 12*c* may be made of one or more materials including metal and metal alloys (e.g., stainless steel, aluminum, tin, iron, gold, silver, platinum, titanium, etc.), natural fabrics, synthetic fabrics, fibers and blends thereof (e.g., cotton, polyester, nylon, satin, silk, wool, leather, etc.), polymers, elastomers, neoprene, plastics, rubbers, elastics, carbon fiber, injection molding, combinations thereof or the like. Wearable electronic device can be manufactured with strap portions of varying lengths to facilitate being worn by a variety of users of different body proportions (e.g., wrist diameter, arm diameter, etc.).

Figure 7:
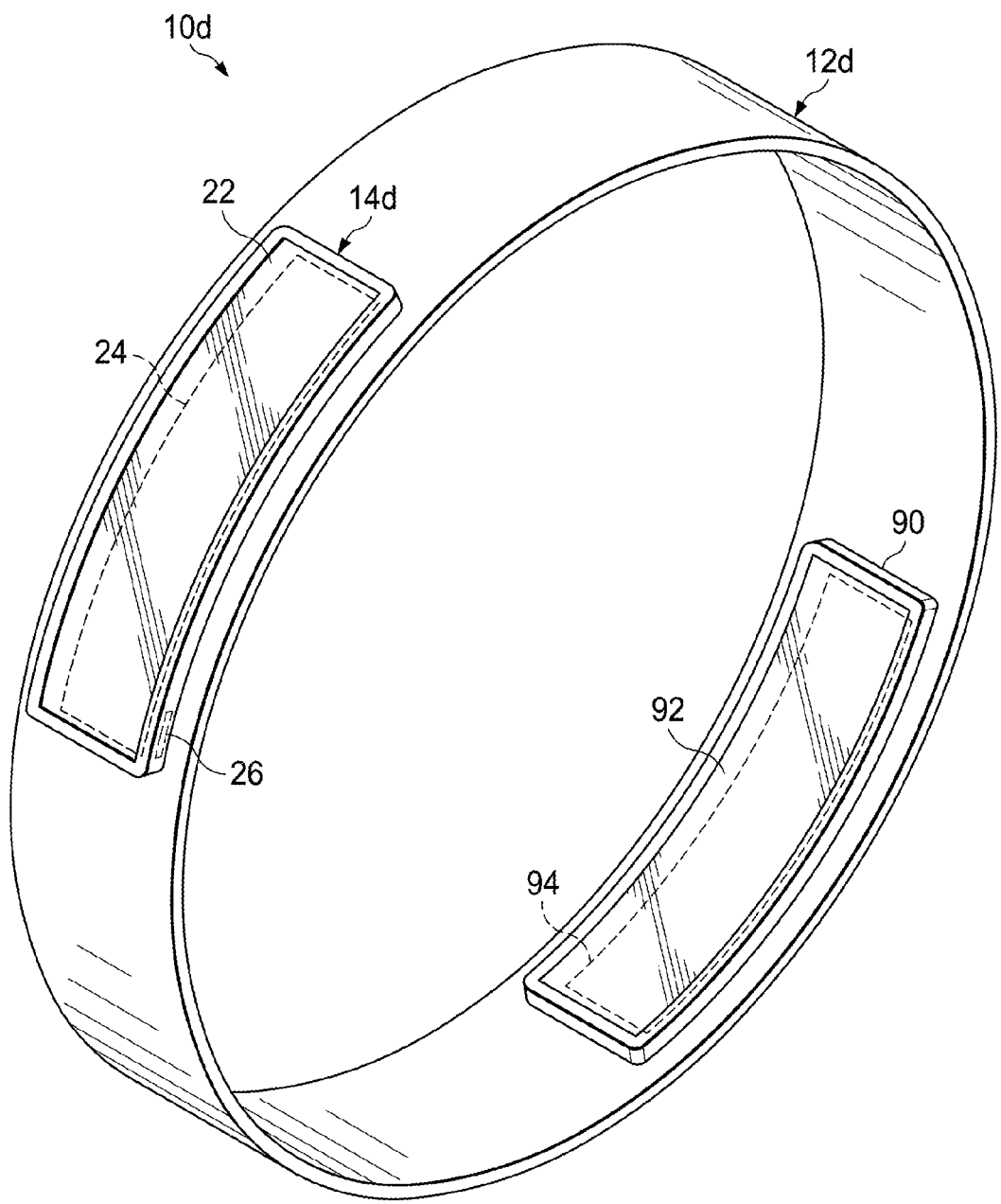
FIG. 7 is a simplified orthographic view illustrating an embodiment of a wearable electronic device, in accordance with one embodiment of the present disclosure.

Turning to FIG. 7, FIG. 7 is a simplified orthographic view illustrating an embodiment of a wearable electronic device 10*d* in accordance with one embodiment of the present disclosure. Wearable electronic device 10*d* can include a strap portion 12*d*, a display portion 14*d* and an inner strap display portion 90. Display portion 14*d* can include main display 22 and fingerprint sensor 24. Inner strap display portion 90 can include an inner strap display 92 and an inner strap fingerprint sensor 94 configured to capture one or more fingerprints for one or more fingers that may be placed on inner strap display 92. Wearable electronic device 10*d* is similar to wearable electronic device 10*a* shown in FIG. 1A except that wearable electronic device 10*d* does not include a latch portion but additionally includes inner strap fingerprint portion 90, inner strap display 92 and inner strap fingerprint sensor 94.

In one or more embodiments, strap portion 12*d* may be of a continuous construction (as shown in FIG. 7), which may not be latched together, or may include a first and a second end which can be latched together. Wearable electronic device 10*d* may provide for capturing one or more fingerprints using inner strap fingerprint sensor 94, which may provide an inconspicuous or hidden (e.g., hidden from others) location for a user to log-in to wearable electronic device 10*d* and/or one or more other electronic devices. Inner strap display portion 90, inner strap display 92 and inner strap fingerprint sensor 94 may be sufficiently large to accommodate multiple fingers of a user that may be placed on inner strap display 92.

Figure 8:
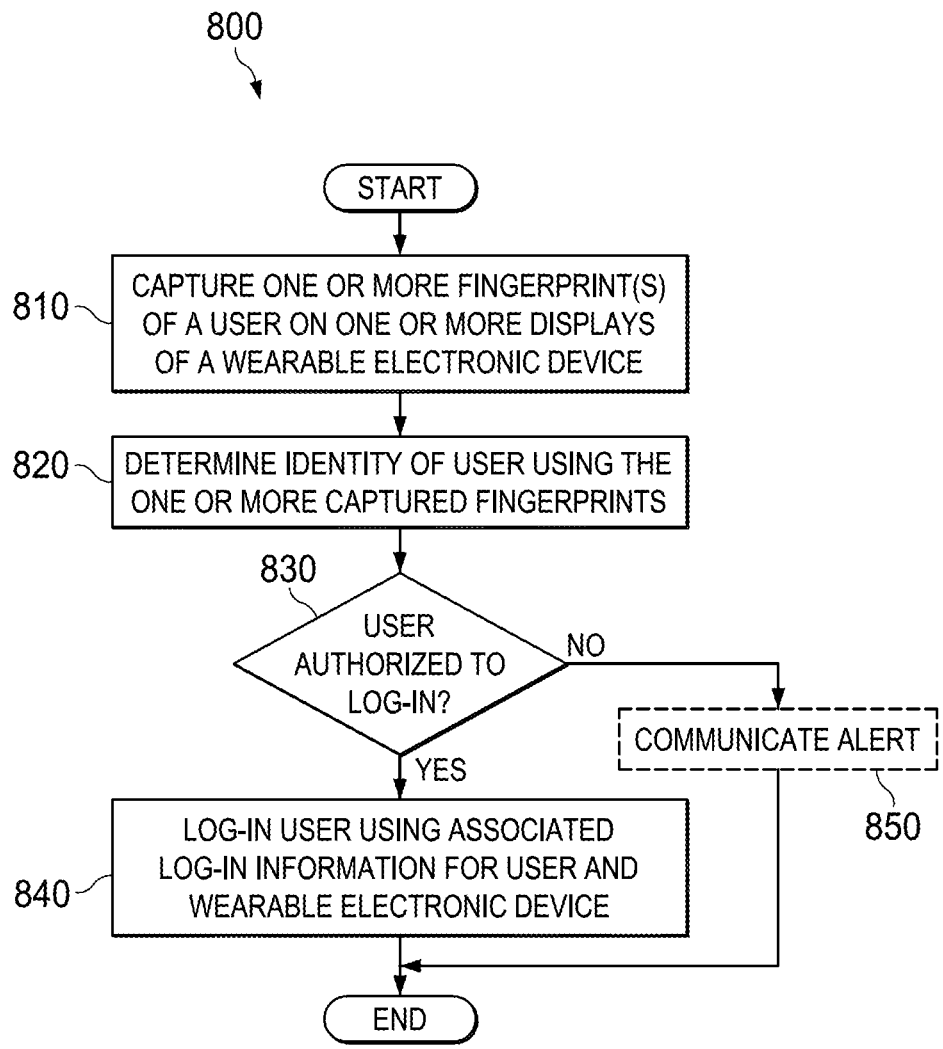
FIG. 8 is a simplified flow diagram illustrating potential operations associated with one embodiment of the present disclosure.

FIG. 8 is a simplified flow diagram 800 illustrating potential operations for a wearable electronic device log-in system in accordance with one embodiment of the present disclosure. The operations may be used to log-in a user to a wearable electronic device, for example, wearable electronic device 10*a*, 10*b*, 10*c* or 10*d*. At 810, the system may capture one or more fingerprints of a user on one or more displays of a wearable electronic device. The system can capture the one or more fingerprints at a plurality of capture locations and a plurality of capture orientations. The one or more fingerprints may be captured using one or more fingerprint sensors, for example fingerprint sensor 24 in wearable electronic device 10*a*, 10*b*, 10*c* or 10*d*, secondary fingerprint sensor 74 in wearable electronic device 10*b* and/or inner strap fingerprint sensor 94 in wearable electronic device 10*d*. At 820, the system may determine an identity of the user using the one or more captured fingerprints. For example, the system can include logic to determine identification information for the one or more captured fingerprints, which may represent the identity of the user. At 830, the system can determine if the user is authorized to log-in to the wearable electronic device. For example, the system can include logic to compare the user's identity to one or more identities stored in wearable electronic device which may have associated thereto log-in information (e.g., username, password, PIN code, passkey, passcode, etc.) for the device. If the user is authorized to log-in to the wearable electronic device (e.g., a match is found), the system may log-in the user to the wearable electronic device at 840. If the user is not authorized to log-in to the wearable electronic device, the operations may end.

In an embodiment, if the user is not authorized to log-in to the wearable electronic device, the system may communicate an alert to the user indicating that the log-in failed at 850. In one or more embodiments, the alert may be displayed on a display, for example, main display 22 or can be an audible alert, a haptic alert, combinations thereof or the like. In one or more embodiments, the system may perform the operations using logic in the system.

Figure 9:
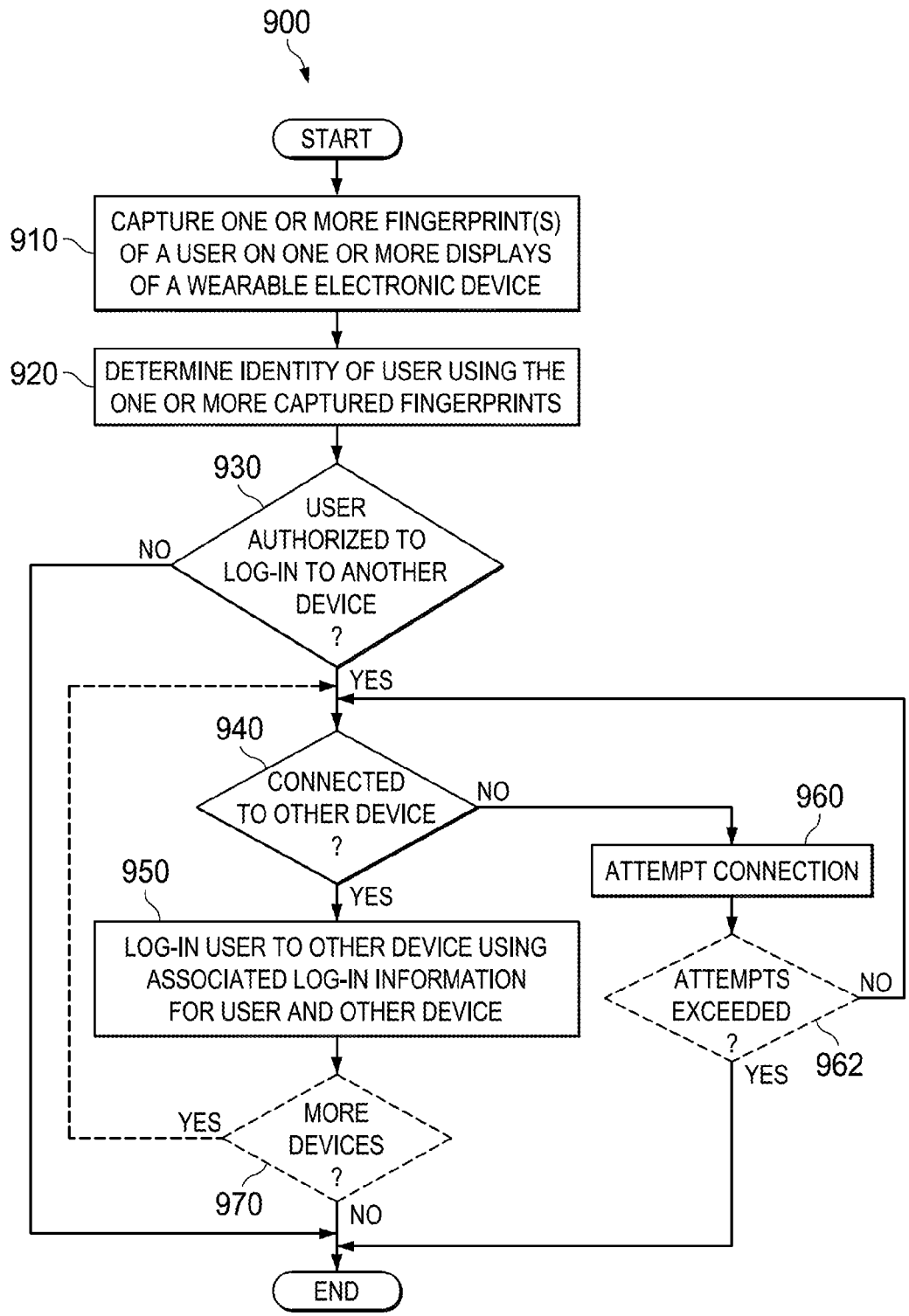
FIG. 9 is a simplified flow diagram illustrating other potential operations associated with one embodiment of the present disclosure.

FIG. 9 is a simplified flow diagram 900 illustrating potential operations for a wearable electronic device log-in system in accordance with one embodiment of the present disclosure. The operations may be used to log-in a user to one or more other devices (e.g., laptops, mobile phones, tablets, phablets, all-in-one or any other electronic device that a user can access through a wireless connection and log-in information) that a wearable electronic device may be configured to communicate with using, for example, wireless communication circuitry. At 910, the system may capture one or more fingerprints of a user on a display of a wearable electronic device. The system can capture the one or more fingerprints at a plurality of capture locations and a plurality of capture orientations. The one or more fingerprints may be captured using one or more fingerprint sensors of a first device, for example fingerprint sensor 24 in wearable electronic device 10a, 10b, 10c or 10d, secondary fingerprint sensor 74 in wearable electronic device 10b and/or inner strap fingerprint sensor 94 in wearable electronic device 10d. At 920, the system may determine an identity of the user using the one or more captured fingerprints. For example, the system can include logic to determine identification information for the one or more captured fingerprints, which may represent the identity of the user.

At 930, the system can determine if the user is authorized to log-in to one or more other electronic devices. For example, the system can include logic to compare the user's identity to one or more identities stored in wearable electronic device which may have associated thereto log-in information for one or more other electronic devices (e.g., phone, laptop, etc.). If the system determines that the user is not authorized to log-in to the wearable electronic device, the operations may end. Otherwise, if the user is authorized to log-in to another electronic device, the system may determine if it is connected to the other device at 940. For example, the system may include logic to determine if a communication connection (e.g., wireless or wired connection) is established with the other device. If it is not connected, the system may attempt to establish a communication connection with the other device at 960. Following the attempt, the system may determine if the connection was established at 940. The system can re-attempt to connect to the device at 960 if no connection was established. In an embodiment, the system can track a number of attempts to connect to device at 962 to determine if a predetermined number of attempts have been exceeded. If so, the operations may end. Otherwise, the system can again determine if the connection was established at 940. Assuming that a connection is established with the other device, the system may log-in the user to the other electronic device using associated log-in information for user and other device ((e.g., username, password, PIN code, passkey, passcode, etc.) at 950 and the log-in operations may end.

Figure 10:
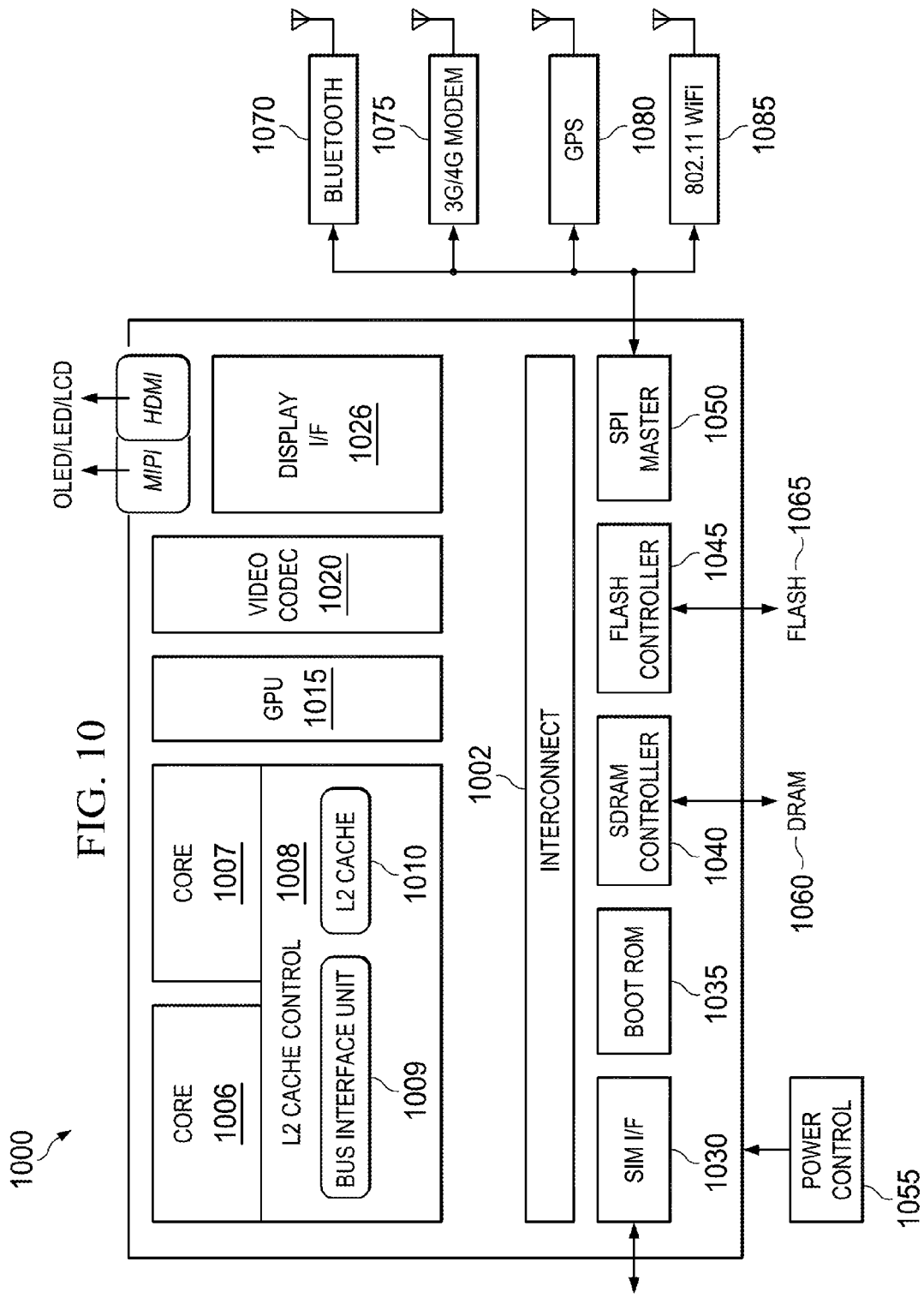
FIG. 10 is a simplified block diagram associated with an example ARM ecosystem on chip (SOC) of the present disclosure.

In an embodiment, the system can determine if the user is authorized to log-in to more devices at 970. If so, the system may return to 940 to determine if it is connected to the device and the operations may continue accordingly. In one or more embodiments, once logged-in to another electronic device, the user may access and use certain features of the other electronic device over the wireless connection established with the other electronic device. In one or more embodiments, this may include but not be limited to, communicating and/or sharing information between the devices such as music, videos, pictures, files, or other such information. In one or more embodiments, the system may perform the operations using logic in the system FIG. 10 is a simplified block diagram associated with an example ARM ecosystem SOC 1000 of the present disclosure. At least one example implementation of the present disclosure can include the fingerprint identification features discussed herein and an ARM component. For example, the example of FIG. 10 can be associated with any ARM core (e.g., A-9, A-15, etc.). Further, the architecture can be part of any type of wearable electronic device, tablet, smartphone (inclusive of Android™ phones, i-Phones™), i-Pad™, Google Nexus™, Microsoft Surface™, video processing components, laptop computer (inclusive of any type of notebook), Ultrabook™ system, any type of touch-enabled input device, etc.

In this example of FIG. 10, ARM ecosystem SOC 1000 may include multiple cores 1006-1007, an L2 cache control 1008, a bus interface unit 1009, an L2 cache 1010, a graphics processing unit (GPU) 1015, an interconnect 1002, a video codec 1020, and an display I/F 1025, which may be associated with mobile industry processor interface (MIPI)/high-definition multimedia interface (HDMI) links that couple to an OLED or LED.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiments may include one or more communication capabilities, interfaces, and features such as instances of Bluetooth™ 1070, a 3G/4G modem 875, a global positioning system (GPS) 1080, and an 802.11 WiFi 1085.

In operation, the example of FIG. 10 can offer processing capabilities, along with relatively low power consumption to enable computing of various types (e.g., mobile computing). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
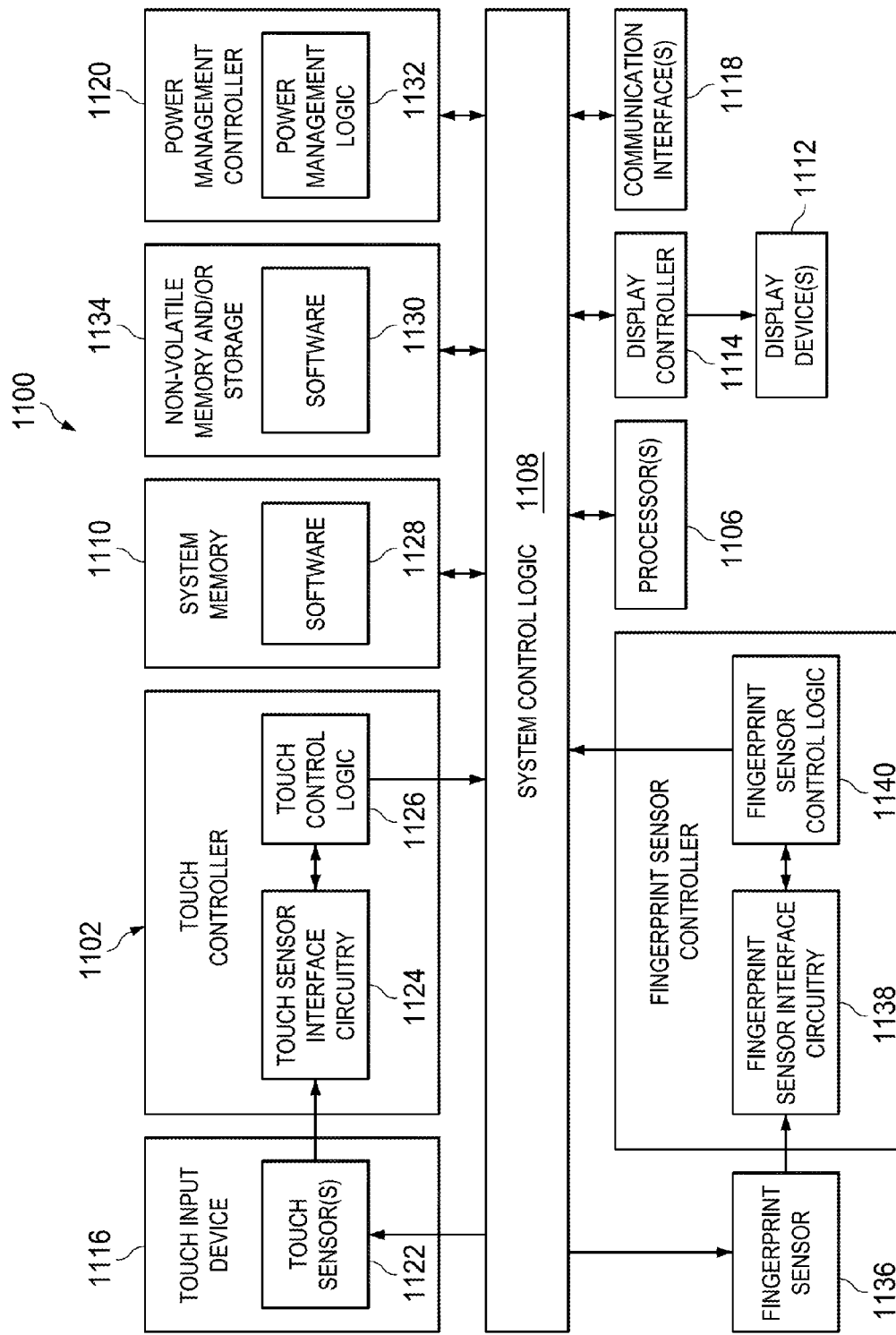
FIG. 11 is a simplified block diagram illustrating example logic that may be used to execute activities associated with the present disclosure.

Turning to FIG. 11, FIG. 11 is a simplified block diagram illustrating potential electronics and system logic that may be associated with wearable electronic device 10a, 10b, 10c and 10d discussed herein. In at least one example embodiment, system 1100 can include a touch controller 1102, a fingerprint sensor controller 1104, one or more processors 1106, system control logic 1108 coupled to at least one of processor(s) 1106, system memory 1110 coupled to system control logic 1108, non-volatile memory and/or storage device(s) 1134 coupled to system control logic 1108, display controller 1114 coupled to system control logic 1108, display controller 1114 coupled to one or more display device(s) 1112, power management controller 1120 coupled to system control logic 1108, and/or communication interfaces 1118 coupled to system control logic 1108.

Hence, the basic building blocks of any wearable electronic device system (e.g., processor, controller, memory, I/O, display, etc.) can be used in conjunction with the teachings of the present disclosure. Certain components could be discrete or integrated into a System on Chip (SoC). Some general system implementations can include certain types of form factors in which system 1100 is part of a more generalized enclosure. In alternate implementations, instead of wearable electronic devices, certain alternate embodiments deal with mobile phones, tablet devices, etc.

System control logic 1108, in at least one embodiment, can include any suitable interface controllers to provide for any suitable interface to at least one processor 1106 and/or to any suitable device or component in communication with system control logic 1108. System control logic 1108, in at least one embodiment, can include one or more memory controllers to provide an interface to system memory 1110. System memory 1110 may be used to load and store data (e.g., registered fingerprint information for one or more fingers) and/or instructions, for example, for system 1100. System memory 1110, in at least one embodiment, can include any suitable volatile memory, such as suitable dynamic random access memory (DRAM) for example. System control logic 1108, in at least one embodiment, can include one or more I/O controllers to provide an interface to display device(s) 1112, touch controller 1102, fingerprint sensor controller 1104, power management controller 1120 and non-volatile memory and/or storage device(s) 1134.

Non-volatile memory and/or storage device(s) 1134 may be used to store data (e.g., registered fingerprint information for one or more fingers) and/or instructions, for example within software 1130. Non-volatile memory and/or storage device(s) 1134 may include any suitable non-volatile memory, such as flash memory for example, and/or may include any suitable non-volatile storage device(s), such as one or more hard disc drives (HDDs), solid state drives (SSDs), etc. for example.

Power management controller 1120 may include power management logic 1132 configured to control various power management and/or power saving functions. In at least one example embodiment, power management controller 1120 is configured to reduce the power consumption of components or devices of system 1100 that may either be operated at reduced power or turned off when the wearable electronic device is in an inactive state (e.g., not being accessed, etc.). For example, in at least one embodiment, when the wearable electronic device is in an inactive state, power management controller 1120 performs one or more of the following: power down the unused portion of the display and/or any backlight associated therewith; allow one or more of processor(s) 1106 to go to a lower power state if less computing power is required during times of inactivity with the display; and shutdown any devices and/or components (e.g., wireless module) that may be unused when a wearable electronic device is in an inactive state.

Communications interface(s) 1118 may provide an interface for system 1100 to communicate over one or more networks and/or with any other suitable device. Communications interface(s) 1118 may include any suitable hardware and/or firmware. Communications interface(s) 1118, in at least one example embodiment, may include, for example, a network adapter, a wireless network adapter, a telephone modem, and/or a wireless modem. System control logic 1108, in at least one embodiment, can include one or more I/O controllers to provide an interface to any suitable input/output device(s) such as, for example, an audio device to help convert sound into corresponding digital signals and/or to help convert digital signals into corresponding sound, a camera or a camcorder.

For at least one embodiment, at least one processor 1106 may be packaged together with logic for one or more controllers of system control logic 1108. In at least one embodiment, at least one processor 1106 may be packaged together with logic for one or more controllers of system control logic 1108 to form a System in Package (SiP). In at least one embodiment, at least one processor 1106 may be integrated on the same die with logic for one or more controllers of system control logic 1108. For at least one embodiment, at least one processor 1106 may be integrated on the same die with logic for one or more controllers of system control logic 1108 to form a System on Chip (SoC).

For touch control, touch controller 1102 may include touch sensor interface circuitry 1124 and touch control logic 1126. Touch sensor interface circuitry 1124 may be coupled to one or more touch sensor(s) 1122 to detect touch input(s) over a first touch surface layer and a second touch surface layer of a display (e.g., at least one display device 1112). Touch sensor interface circuitry 1124 may include any suitable circuitry that may depend, for example, at least in part on the touch-sensitive technology used for a touch input device 1116, which may include one or more touch sensor(s) 1122. Touch sensor interface circuitry 1124, in one embodiment, may support any suitable multi-touch technology. Touch sensor interface circuitry 1124, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1126 may be coupled to touch sensor interface circuitry 1124 to help control touch sensor interface circuitry 1124 in any suitable manner to detect touch input over a first touch surface layer and a second touch surface layer. Touch control logic 1126 for at least one example embodiment may also be coupled to system control logic 1108 to output in any suitable manner digital touch input data corresponding to touch input detected by touch sensor interface circuitry 1124. Touch control logic 1126 may be implemented using any suitable logic, including any suitable hardware, firmware, and/or software logic (e.g., non-transitory tangible media), that may depend, for example, at least in part on the circuitry used for touch sensor interface circuitry 1124. Touch control logic 1126 for at least one embodiment may support any suitable multi-touch technology.

Touch control logic 1126 may be coupled to system control logic 1108 to output digital touch input data to system control logic 1108 and/or at least one processor 1106 for processing. At least one processor 1106 for at least one embodiment may execute any suitable software to process digital touch input data output from touch control logic 1126. Suitable software may include, for example, any suitable driver software and/or any suitable application software.

For fingerprint sensor control, fingerprint sensor controller 1104 may include touch sensor interface circuitry 1138 and fingerprint sensor control logic 1140. Fingerprint sensor interface circuitry 1138 may be coupled to a fingerprint sensor 1136 to control operation of fingerprint sensor 1136 and receive one or more captured fingerprints that may be captured over a surface layer of a display (e.g., at least one display device 1112) using fingerprint sensor 1136. Fingerprint sensor interface circuitry 1138 may include any suitable circuitry that may depend, for example, at least in part on the fingerprint sensor technology for fingerprint sensor 1136. Fingerprint sensor interface circuitry 1138, in one or more embodiments, may support any suitable multi-fingerprint capturing technology. Fingerprint sensor interface circuitry 1138, in at least one embodiment, can include any suitable circuitry to convert analog signals corresponding to a captured fingerprint into any suitable digital fingerprint data. Suitable digital fingerprint data for at least one embodiment may include, for example, a fingerprint image or capacitive ridge/valley measurement data for a fingerprint.

Fingerprint sensor control logic 1140 may be coupled to help control fingerprint sensor interface circuitry 1138 in any suitable manner to control fingerprint sensor 836 capture one or more fingerprints. Fingerprint sensor control logic 1140, for at least one example embodiment, may also be coupled to system control logic 1108 to output in any suitable manner digital fingerprint data corresponding to a captured fingerprint received by fingerprint sensor interface circuitry 1138. Fingerprint sensor control logic 1140 may be implemented using any suitable logic, including any suitable hardware, firmware, and/or software logic (e.g., non-transitory tangible media), that may depend, for example, at least in part on the circuitry used for fingerprint sensor interface circuitry 1138. Fingerprint sensor control logic 1140, for at least one embodiment, may support any suitable multi-fingerprint capturing technology.

Fingerprint sensor control logic 1140 may be coupled to system control logic 1108 to output digital fingerprint data to system control logic 1110 and/or at least one processor 1106 for processing. At least one processor 1110 for at least one embodiment may execute any suitable software to process digital fingerprint data output from fingerprint sensor control logic 1140. For example, fingerprint data may, in one or more embodiments, be processed to determine an identity of a user, to determine if the user is authorized to log-in to a wearable electronic device and to log-in the user to the device if the user is authorized to do so. Suitable software may include, for example, any suitable driver software and/or any suitable application software. As illustrated in FIG. 11, system memory 1110 may store suitable software 1128 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

Example embodiments described herein provide for a wearable electronic device, such as an electronic bracelet, watch, wristband or armband that includes a circuit board coupled to a plurality of electronic components (which may include any type of components, elements, circuitry, etc.). One particular example implementation of a wearable electronic device may include a strap portion and a first display portion included in the strap portion. The first display portion can include a main display and a first fingerprint sensor configured to capture one or more fingerprints placed on the main display at one or more capture locations. Note that, in at least one embodiment, the first fingerprint sensor can be further configured to capture one or more fingerprints in one or more capture orientations of one or more fingers of a user placed on the main display. In another embodiment, the strap portion is configured to wrap around a wrist of a user and wherein the main display and first fingerprint sensor are flexible to bend with the strap portion when the wearable electronic device is worn by the user.

Note that, in at least one embodiment, the strap portion can include a first end and a second end and the wearable electronic device can include a latch portion. The latch portion can include a latch control device provided to allow operation of the latch. In an embodiment a secondary display portion can be provided in the latch control device, which can include a secondary display and a secondary fingerprint sensor configured to capture a fingerprint placed on the secondary display. In yet other embodiments, the wearable electronic device can include an inner strap display portion configured on an inner side of the strap portion. The inner strap display portion can include an inner strap display and an inner strap fingerprint sensor configured to capture one or more fingerprints placed on the inner strap display at one or more capture locations.

In other implementations, logic can be provided to capture one or more fingerprints of a user using the first fingerprint sensor, to determine an identity of the user using the one or more captured fingerprints and to log-in in the user to the wearable electronic device if the user is authorized to log-in to the wearable electronic device. In yet other implementations, the wearable electronic device can include wireless communication circuitry such that the wearable electronic device can communicate with one or more other electronic devices. In certain cases, to capture one or more fingerprints of a user using the first fingerprint sensor, to determine an identity of the user using the one or more captured fingerprints and to log-in the user to one or more of the other electronic devices that the user is authorized to log-in to using the wireless communication circuitry.

OTHER NOTES AND EXAMPLES

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is a wearable electronic device, comprising: a strap portion; and a first display portion included in the strap portion, wherein the first display portion includes a main display and a first fingerprint sensor configured to capture one or more fingerprints placed on the main display at one or more capture locations.

In Example 2, the subject matter of Example 1 can optionally include the first display having an overall length of at least half of an overall length of the strap portion.

In Example 3, the subject matter of any one of Examples 1-2 can optionally include the strap portion being configured to wrap around a wrist of a user and wherein the main display and first fingerprint sensor are flexible to bend with the strap portion when the wearable electronic device is worn by the user.

In Example 4, the subject matter of any one of Examples 1-3 can optionally include the main display and first fingerprint sensor being sufficiently large to capture a plurality of simultaneous fingerprints associated with a plurality of fingers of a user placed on the main display.

In Example 5, the subject matter of any of Examples 1-4 can optionally include the first fingerprint sensor being further configured to capture one or more fingerprints in one or more capture orientations of one or more fingers of a user placed on the main display at the one or more of capture locations.

In Example 6, the subject matter of any one of Examples 1-5 can optionally include logic to register an identity of a user based on one or more fingerprints of the user that have been captured using the first fingerprint sensor and to associate the identity of the user with log-in information for the wearable electronic device.

In Example 7, the subject matter of Example 6 can optionally include the registered identity of the user being represented by identification information, which includes at least one of: ridge and valley information associated with one or more digital fingerprint images of the one or more captured fingerprints that identify the user; and one or more metrics associated with the one or more captured fingerprints that identify the user.

In Example 8, the subject matter of any one of Examples 1-7 can optionally include logic to capture one or more fingerprints of a user using the first fingerprint sensor, to determine an identity of the user using the one or more captured fingerprints and to log-in in the user to the wearable electronic device if the user is authorized to log-in to the wearable electronic device.

In Example 9, the subject matter of any one of Examples 1-8 can optionally include wireless communication circuitry, wherein the wearable electronic device is configured to communicate with one or more other electronic devices using the wireless communication circuitry; and logic to capture one or more fingerprints of a user using the first fingerprint sensor, to determine an identity of the user using the one or more captured fingerprints and to log-in the user to one or more of the other electronic devices that the user is authorized to log-in to using the wireless communication circuitry.

In Example 10, the subject matter of any one of Examples 1-9 can optionally include the strap portion including a first end and a second end and wherein the wearable electronic device further comprises a latch portion, wherein the latch portion includes a latch control device provided to allow operation of the latch and wherein a secondary display portion is provided in the latch control device and wherein the secondary display portion includes a secondary display and a secondary fingerprint sensor configured to capture a fingerprint placed on the secondary display.

In Example 11, the subject matter of Example 10 can optionally include logic to capture one or more fingerprints of a user using at least one of the first fingerprint sensor and the secondary fingerprint sensor, to determine an identity of the user using the one or more captured fingerprints and to log-in the user to the wearable electronic device if the user is authorized to log-in to the wearable electronic device.

In Example 12, the subject matter of any one of Examples 1-11 can optionally include an inner strap display portion configured on an inner side of the strap portion, wherein the inner strap display portion includes an inner strap display and inner strap fingerprint sensor configured to capture one or more fingerprints placed on the inner strap display at one or more capture locations.

Example 13 is a wearable electronic device, comprising: logic, at least a portion of which is partially implemented in hardware, the logic configured to: capture one or more fingerprints of a user using one or more fingerprint sensors provided in one or more portions of the wearable electronic device, wherein the one or more fingerprint sensors are configured to capture the one or more fingerprints at one or more capture locations and one or more capture orientations; determine an identity of the user using the one or more captured fingerprints; and log-in the user to the wearable electronic device if the user is authorized to access the wearable electronic device.

In Example 14, the subject matter of Example 13 can optionally include the logic being further configured to generate feedback for the user associated with the capture of the one or more fingerprints.

In Example 15, the subject matter of Example 14 can optionally include the feedback including at least one of: a status message provided on a display during the capture that indicates a capture percentage; a status message provided on a display indicating which of one or more fingerprints may be currently being captured; a haptic effect indicating that the capture of the one or more fingerprints has completed; and an alert indicating that the log-in has failed if the user is not authorized to log-in to the wearable electronic device.

In Example 16, the subject matter of any one of Examples 13-15 can optionally include the logic being further configured to determine whether the user is authorized to log-in to one or more other electronic devices; communicate with a particular electronic device using wireless communication circuitry if the user is authorized to log-in to the particular electronic device; and log-in the user to the particular electronic device if the user is authorized to log-in to the particular electronic device.

In Example 17, the subject matter of any one of Examples 13-16 can optionally include the logic being further configured to provide power to one or more displays and the one or more fingerprint sensors if a latching mechanism of the wearable electronic device is engaged.

In Example 18, the subject matter of any one of Examples 13-17 can optionally include the logic being further configured to register an identity of a user based on one or more fingerprints of the user that have been captured using the one or more fingerprint sensors; and associate the identity of the user with log-in information for the wearable electronic device.

In Example 19, the subject matter of Example 18 can optionally include the registered identity of the user being represented by identification information, which includes at least one of: ridge and valley information associated with one or more digital fingerprint images of the one or more captured fingerprints that identify the user; and one or more metrics associated with the one or more captured fingerprints that identify the user.

Example 20 is at least one computer readable storage medium comprising instructions that, when executed, cause an apparatus to: capture one or more fingerprints of a user using one or more fingerprint sensors provided in one or more portions of a wearable electronic device, wherein the one or more fingerprint sensors are configured to capture the one or more fingerprints at one or more capture locations and one or more capture orientations; determine an identity of the user using the one or more captured fingerprints; and log-in the user to the wearable electronic device if the user is authorized to log-in to the wearable electronic device.

In Example 21, the subject matter of Example 20 can optionally include instructions that, when executed, cause the apparatus to generate feedback for the user associated with the capture of the one or more fingerprints.

In Example 22, the subject matter of Example 21 can optionally include the feedback including at least one of: a status message provided on a display during the capture that indicates a capture percentage; a status message provided on a display indicating which of one or more fingerprints may be currently being captured; a haptic effect indicating that the capture of the one or more fingerprints has completed; and an alert indicating that the log-in has failed if the user is not authorized to log-in to the wearable electronic device.

In Example 23, the subject matter of any one of Examples 20-22 can optionally include instructions that, when executed, cause the apparatus to determine whether the user is authorized to log-in to one or more other electronic devices; communicate with the other electronic devices using wireless communication circuitry if the user is authorized to log-in to the other electronic devices; and log-in the user to one or more of the other electronic devices if the user is authorized to log-in to the other electronic devices.

In Example 24, the subject matter of any one of Examples 20-23 can optionally include instructions that, when executed, cause the apparatus to provide power to one or more displays and the one or more fingerprint sensors if a latching mechanism of the apparatus is engaged.

In Example 25, the subject matter of any one of Examples 20-24 can optionally include instructions that, when executed, cause the apparatus to register an identity of a user based on one or more fingerprints of the user that have been captured using the one or more fingerprint sensors; and associate the identity of the user with log-in information for the wearable electronic device.

In Example 26, the subject matter of Example 25 can optionally include the registered identity of the user being represented by identification information, which includes at least one of: ridge and valley information associated with one or more digital fingerprint images of the one or more captured fingerprints that identify the user; and one or more metrics associated with the one or more captured fingerprints that identify the user.

Example 27 is a method comprising capturing one or more fingerprints of a user using one or more fingerprint sensors provided in one or more portions of a wearable electronic device, wherein the one or more fingerprint sensors are configured to capture the one or more fingerprints at one or more capture locations and one or more capture orientations; determining an identity of the user using the one or more captured fingerprints; and logging-in the user to the wearable electronic device if the user is authorized to log-in to the wearable electronic device.

In Example 28, the subject matter of Example 27 can optionally include generating feedback for the user associated with the capture of the one or more fingerprints.

In Example 29, the subject matter of Example 28 can optionally include the feedback including at least one of: a status message provided on a display during the capture that indicates a capture percentage; a status message provided on a display indicating which of one or more fingerprints may be currently being captured; a haptic effect indicating that the capture of the one or more fingerprints has completed; and an alert indicating that the log-in has failed if the user is not authorized to log-in to the wearable electronic device.

In Example 30, the subject matter of any one of Examples 27-29 can optionally include determining whether the user is authorized to log-in to one or more other electronic devices; communicating with the other electronic devices using wireless communication circuitry if the user is authorized to log-in to the other electronic devices; and logging-in the user to one or more of the other electronic devices if the user is authorized to log-in to the other electronic devices.

In Example 31, the subject matter of any one of Examples 27-30 can optionally include providing power to one or more displays and the one or more fingerprint sensors if a latching mechanism of the apparatus is engaged.

In Example 32, the subject matter of any one of Examples 27-31 can optionally include registering an identity of a user based on one or more fingerprints of the user that have been captured using the one or more fingerprint sensors; and associating the identity of the user with log-in information for the wearable electronic device.

In Example 33, the subject matter of Examples 32 can optionally include the registered identity of the user being represented by identification information, which includes at least one of: ridge and valley information associated with one or more digital fingerprint images of the one or more captured fingerprints that identify the user; and one or more metrics associated with the one or more captured fingerprints that identify the user.

Example 34 is an apparatus comprising means for performing the method of any one of Examples 27-33.

In Example 35, the subject matter of Example 34 can optionally include the means for performing the method comprising a processor and a memory.

In Example 36, the subject matter of Example 35 can optionally include the memory further comprising machine readable instructions, that when executed cause the apparatus to perform the method of any one of Examples 27-33.

In Example 37, the subject matter of any one of Examples 34-36 can optionally include the apparatus being a computing system.

Example 38 is at least one computer readable medium comprising instructions that, when executed, implement a method or realize an apparatus as recited in any one of Examples 1-19 or 27-37.

Example 39 is an apparatus comprising: means for capturing one or more fingerprints of a user using one or more fingerprint sensors provided in one or more portions of a wearable electronic device, wherein the one or more fingerprint sensors are configured to capture the one or more fingerprints at one or more capture locations and one or more capture orientations; means for determining an identity of the user using the one or more captured fingerprints; and means logging-in the user to the wearable electronic device if the user is authorized to log-in to the wearable electronic device.

In Example 40, the subject matter of Example 39 can optionally include means for generating feedback for the user associated with the capture of the one or more fingerprints.

In Example 41, the subject matter of Example 40 can optionally include the feedback including at least one of a status message provided on a display means during the capture that indicates a capture percentage; a status message provided on a display means indicating which of one or more fingerprints may be currently being captured; a haptic effect indicating that the capture of the one or more fingerprints has completed; and an alert indicating that the log-in has failed if the user is not authorized to log-in to the wearable electronic device.

In Example 42, the subject matter of any one of Examples 39-41 can optionally include: means for determining whether the user is authorized to log-in to one or more other electronic devices; means for communicating with the other electronic devices using wireless communication circuitry if the user is authorized to log-in to the other electronic devices; and means for logging-in the user to one or more of the other electronic devices if the user is authorized to log-in to the other electronic devices.

In Example 43, the subject matter of any one of Examples 39-42 can optionally include means for providing power to one or more displays and the one or more fingerprint sensors if a latching mechanism of the apparatus is engaged.

In Example 44, the subject matter of any one of Examples 39-43 can optionally include: means for registering an identity of a user based on one or more fingerprints of the user that have been captured using the one or more fingerprint sensors; and means for associating the identity of the user with log-in information for the wearable electronic device.

In Example 45, the subject matter of Example 39 can optionally include the registered identity of the user being represented by identification information, which includes at least one of: ridge and valley information associated with one or more digital fingerprint images of the one or more captured fingerprints that identify the user; and one or more metrics associated with the one or more captured fingerprints that identify the user.

What is claimed is:

1. A wearable electronic device, comprising:
   logic, at least a portion of which is partially implemented in hardware, the logic configured to:
   capture a plurality of fingerprints of a user at an approximately same time using one or more fingerprint sensors provided in one or more portions of the wearable electronic device, wherein the one or more fingerprint sensors are configured to capture the plurality of fingerprints at one or more capture locations and one or more capture orientations;
   determine an identity of the user using a first set of one or more of the plurality of captured fingerprints;
   log-in the user to the wearable electronic device if the user is authorized to access the wearable electronic device;
   determine whether the user is authorized to log-in to at least one other electronic device using a second set of one or more of the plurality of captured fingerprints, wherein the first set of one or more of the plurality of fingerprints are captured from a first set of one or more fingers of the user and the second set of one or more of the plurality of fingerprints are captured from a second set of one or more fingers of the user different from the first set; and
   log-in the user to at least one other electronic device if the user is authorized to log-in to at least one other electronic device.

2. The wearable electronic device of claim 1, wherein the logic is further configured to:
   generate feedback for the user associated with the capture of the plurality of fingerprints.

3. The wearable electronic device of claim 2, wherein the feedback includes at least one of:
   a status message provided on a display during the capture that indicates a capture percentage;
   a status message provided on a display indicating which of the plurality of fingerprints may be currently being captured;
   a haptic effect indicating that the capture of the plurality of fingerprints has completed; and
   an alert indicating that the log-in has failed if the user is not authorized to log-in to the wearable electronic device.

4. The wearable electronic device of claim 1, wherein the logic is further configured to:
   communicate with at least one other electronic device using wireless communication circuitry if the user is authorized to log-in to at least one other electronic device.

5. The wearable electronic device of claim 1, wherein the logic is further configured to:
   provide power to one or more displays and the one or more fingerprint sensors if a latching mechanism of the wearable electronic device is engaged.

6. At least one non-transitory computer readable storage medium comprising instructions that, when executed, cause an apparatus to:
   capture a plurality of fingerprints of a user at an approximately same time using one or more fingerprint sensors provided in one or more portions of a wearable electronic device, wherein the one or more fingerprint sensors are configured to capture the plurality of fingerprints at one or more capture locations and one or more capture orientations;
   determine an identity of the user using a first set of one or more of the plurality of captured fingerprints;
   log-in the user to the wearable electronic device if the user is authorized to log-in to the wearable electronic device;
   determine whether the user is authorized to log-in to at least one other electronic device using a second set of one or more captured fingerprints, wherein the first set of one or more of the plurality of fingerprints are captured from a first set of one or more fingers of the user and the second set of one or more of the plurality of fingerprints are captured from a second set of one or more fingers of the user different from the first set; and
   log-in the user to at least one other electronic devices if the user is authorized to log-in to at least one other electronic device.

7. The medium of claim 6, further comprising instructions that, when executed, cause the apparatus to:
   generate feedback for the user associated with the capture of the plurality of fingerprints.

8. The medium of claim 6, further comprising instructions that, when executed, cause the apparatus to:
communicate with at least one other electronic device using wireless communication circuitry if the user is authorized to log-in to at least one other electronic device.

9. The medium of claim 6, further comprising instructions that, when executed, cause the apparatus to:
provide power to one or more displays and the one or more fingerprint sensors if a latching mechanism of the apparatus is engaged.

10. A method comprising:
capturing a plurality of fingerprints of a user at an approximately same time using one or more fingerprint sensors provided in one or more portions of a wearable electronic device, wherein the one or more fingerprint sensors are configured to capture the plurality of fingerprints at one or more capture locations and one or more capture orientations;
determining an identity the user using a first set of one or more of the plurality of captured fingerprints;
logging-in the user to the wearable electronic device if the user is authorized to log-in to the wearable electronic device;
determining whether the user is authorized to log-in to at least one other electronic device using a second set of one or more of the plurality of captured fingerprints, wherein the first set of one or more of the plurality of fingerprints are captured from a first set of one or more fingers of the user and the second set of one or more of the plurality of fingerprints are captured from a second set of one or more fingers of the user different from the first set; and
logging-in the user to at least one other electronic device if the user is authorized to log-in to at least one other electronic device.

11. The method of claim 10, wherein the capturing is performed using a first fingerprint sensor configured in a first display portion of the wearable electronic device and a second fingerprint sensor configured in a latch portion of the wearable electronic device.

12. The method of claim 10, further comprising:
communicating with at least one other electronic device using wireless communication circuitry if the user is authorized to log-in to at least one other electronic device.

13. The method of claim 10, further comprising:
providing power to one or more displays and the one or more fingerprint sensors of the wearable electronic device if a latching mechanism of the wearable electronic device is engaged.

14. The method of claim 10, further comprising:
generating feedback for the user associated with the capture of the plurality of fingerprints.

15. The method of claim 14, wherein the feedback includes at least one of:
a status message provided on a display during the capture that indicates a capture percentage;
a status message provided on a display indicating which of the plurality of fingerprints may be currently being captured;
a haptic effect indicating that the capture of the plurality of fingerprints has completed; and
an alert indicating that the log-in has failed if the user is not authorized to log-in to the wearable electronic device.

16. The medium of claim 7, wherein the feedback includes at least one of:
a status message provided on a display during the capture that indicates a capture percentage;
a status message provided on a display indicating which of the plurality of fingerprints may be currently being captured;
a haptic effect indicating that the capture of the plurality of fingerprints has completed; and
an alert indicating that the log-in has failed if the user is not authorized to log-in to the wearable electronic device.

* * * * *